(12) United States Patent
Czirjak et al.

(10) Patent No.: US 11,407,097 B2
(45) Date of Patent: Aug. 9, 2022

(54) POWER BASE MODULE

(71) Applicant: Robert Bosch GmbH, Stuttgart (DE)

(72) Inventors: Peter Czirjak, Miskolc (HU); Dominik Meier, Munich (DE); Anne Purper, Nuertingen (DE); Laszlo Gergely, Felsoezsolca (HU); Istvan Szell, Leinfelden-Echterdingen (DE); Thomas Hampel, Magstadt (DE); Aniko Beres, Eger (HU); Zoltan Varga, Miskolc (HU); Dennis Garcia-Franco, Stuttgart (DE); Guenther Schlachter, Waldenbuch (DE); Hendrik Hesse, Steinenbronn (DE); Timo Etzel, Neuhausen A.D.F. (DE); Bence Simko, Edeleny (HU); Daniel-Philipp Friedmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 16/470,519

(22) PCT Filed: Dec. 18, 2017

(86) PCT No.: PCT/EP2017/083224
§ 371 (c)(1),
(2) Date: Jun. 17, 2019

(87) PCT Pub. No.: WO2018/114750
PCT Pub. Date: Jun. 28, 2018

(65) Prior Publication Data
US 2019/0321960 A1    Oct. 24, 2019

(30) Foreign Application Priority Data

Dec. 19, 2016  (DE) .................... 10 2016 225 383.2
Dec. 15, 2017  (DE) .................... 10 2017 222 869.5

(51) Int. Cl.
B25F 3/00      (2006.01)
B23Q 11/00    (2006.01)
(Continued)

(52) U.S. Cl.
CPC ................ B25F 3/00 (2013.01); B23B 45/00 (2013.01); B23Q 11/0078 (2013.01);
(Continued)

(58) Field of Classification Search
CPC .......... B25F 3/00; B25F 5/02; B23Q 11/0078; B25B 23/147; B25D 2250/101
(Continued)

(56) References Cited

U.S. PATENT DOCUMENTS

| | | | |
|---|---|---|---|
| 2005/0033544 A1* | 2/2005 | Brooks ................ | G07D 7/04 702/128 |
| 2010/0032179 A1* | 2/2010 | Hanspers .............. | B25F 5/00 173/11 |

(Continued)

FOREIGN PATENT DOCUMENTS

| DE | 10 2008 003 484 A1 | 7/2009 |
|---|---|---|
| DE | 10 2011 089 343 A1 | 6/2013 |

(Continued)

OTHER PUBLICATIONS

International Search Report corresponding to PCT Application No. PCT/EP2017/083224, dated Mar. 28, 2018 (German and English language document) (5 pages).

*Primary Examiner* — Michelle Lopez
(74) *Attorney, Agent, or Firm* — Maginot, Moore & Beck LLP

(57) ABSTRACT

A drive base module of a modularly constructed multifunctional handheld machine is configured to connect to at least one attachment device. The drive base module includes at least one connection device including at least one drive-
(Continued)

technological interface and/or a data-technological interface configured to connect to the at least one attachment device. The drive base module further includes at least one drive unit configured to drive the at least one attachment device in a state in which the at least one attachment device is connected to the at least one connection device. The drive base module further includes at least one rechargeable battery unit; and at least one information output unit configured to output information to an operator acoustically and/or haptically.

19 Claims, 20 Drawing Sheets

(51) Int. Cl.
*B25B 23/147* (2006.01)
*B25F 5/02* (2006.01)
*B23B 45/00* (2006.01)
*H02K 7/14* (2006.01)
*H02P 23/00* (2016.01)

(52) U.S. Cl.
CPC .............. *B25B 23/147* (2013.01); *B25F 5/02* (2013.01); *H02K 7/145* (2013.01); *H02P 23/0027* (2013.01); *B25D 2250/101* (2013.01); *B25D 2250/221* (2013.01)

(58) Field of Classification Search
USPC .......................................................... 173/46
See application file for complete search history.

(56) References Cited

U.S. PATENT DOCUMENTS

| | | | |
|---|---|---|---|
| 2011/0203819 A1* | 8/2011 | Tsai | B25B 21/00 173/1 |
| 2012/0318545 A1* | 12/2012 | Schreiber | B25F 5/00 173/1 |
| 2013/0228355 A1 | 9/2013 | Kuehne et al. | |

FOREIGN PATENT DOCUMENTS

| | | |
|---|---|---|
| DE | 10 2012 216 189 A1 | 3/2014 |
| EP | 2 177 322 A1 | 4/2010 |
| WO | 2016/100213 A1 | 6/2016 |
| WO | 2016/196984 A1 | 12/2016 |

* cited by examiner

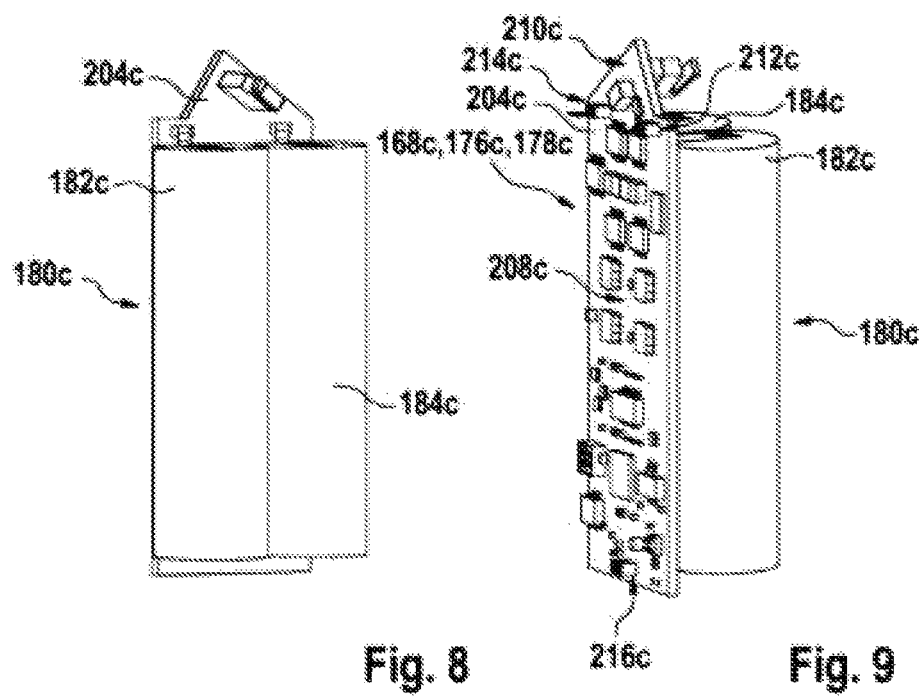
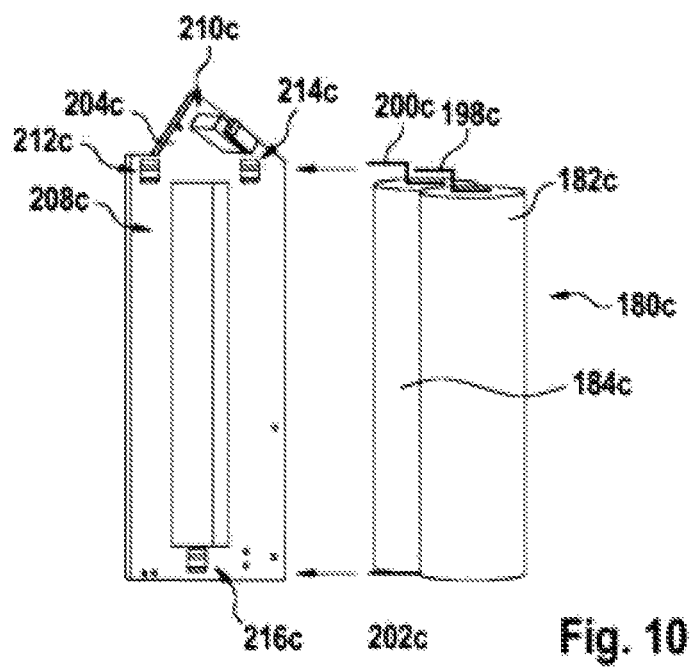

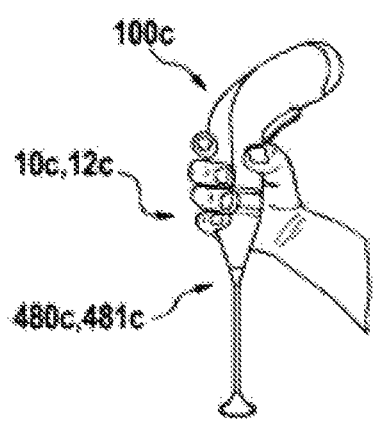
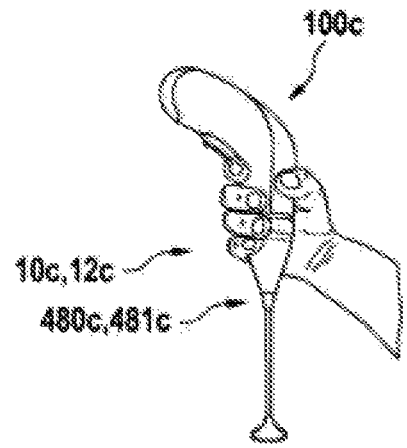
Fig. 23　　　　Fig. 24
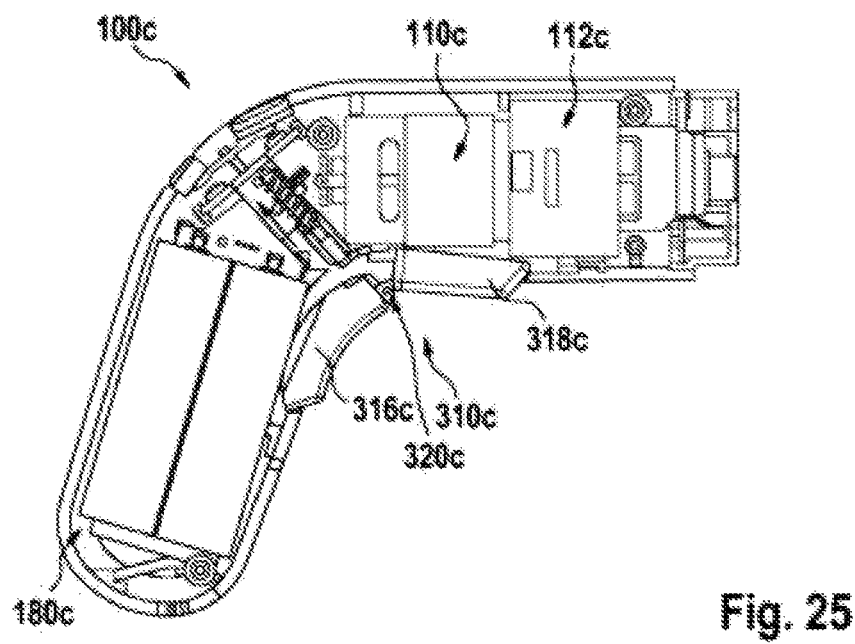
Fig. 25

POWER BASE MODULE

This application is a 35 U.S.C. § 371 National Stage Application of PCT/EP2017/083224, filed on Dec. 18, 2017, which claims the benefit of priority to (i) Serial No. DE 10 2016 225 383.2, filed on Dec. 19, 2016 in Germany, and (ii) Serial No. DE 10 2017 222 869.5 filed on Dec. 15, 2017, the disclosures of which are incorporated herein by reference in their entirety.

BACKGROUND

Drive base modules comprising a wired drive unit and comprising an information output unit, for example a display or LEDs provided for visual feedback, are already known. A user can be given haptic feedback by means of a resistance and/or a stop of an actuation element provided for actuating the drive unit.

US 20130228355 A1 has already proposed a drive base module for connection to various attachment devices which comprises at least one connection device having at least one interface for drive-technological connection to at least one attachment device and which has at least one drive unit for driving the attachment device in a state in which the attachment device is connected to the connection device.

SUMMARY

The disclosure is based on a drive base module, in particular a handheld drive base module, advantageously of a modularly constructed multifunctional handheld machine, for connection to various attachment devices, comprising at least one connection device, which has at least one interface for drive-technological and/or data-technological connection to at least one attachment device, and comprising at least one drive unit, in particular an electric motor, for driving the attachment device in a state in which the attachment device is connected to the connection device, and in particular comprising at least one rechargeable battery unit.

It is proposed that the drive base module comprises at least one information output unit provided at least for outputting information to an operator acoustically and/or haptically. By virtue of the configuration of the drive base module according to the disclosure, high user convenience, in particular, can be achieved. Advantageously, an operator can be supplied with information in an easily perceptible manner even during operation. Particularly advantageously, an operator can be supplied with acoustic information, preferably redundant with respect to visual and/or haptic information. Advantageously, operation-governed and/or safety-governed information can be output and/or an operator can be warned of critical situations.

A "drive base module" should be understood to mean, in particular, a base module—equipped at least with a drive function—of a modularly constructed multifunctional machine, in particular of a multifunctional portable machine tool, which is provided at least for driving an attachment device, in particular in at least one state in which the attachment device is connected to the base module. "Provided" should be understood to mean, in particular, specifically programmed, designed and/or equipped. The fact that an object is provided for a specific function should be understood to mean, in particular, that the object fulfills and/or performs this specific function in at least one application and/or operating state. Preferably, the drive unit of the drive base module is embodied as an electric motor, as an hydraulic motor, as a pneumatic motor, as an electromechanical actuator, as a piezoactuator, as an internal combustion engine and/or as a hybrid motor. An "attachment device" should be understood to mean, in particular, a device which is provided for being connected to the drive base module at least mechanically and/or electronically for enabling a drive and/or a transmission of electronic signals and which is provided for fulfilling a function, in particular a handheld machine tool function. Preferably, the attachment device is provided for fulfilling a screwing, drilling, percussion drilling, hammer drilling, hammering sawing, milling, pumping, pumping-away, pressing, suction, stapling, stamping, blowing, applying, illuminating and/or grinding function. Furthermore, it is conceivable for the attachment device to combine a plurality of functions, in particular individually selectable functions. It is likewise conceivable for the attachment device to fulfill at least one function which is different than a handheld machine tool function. Preferably, the attachment device comprises a connection device that is complementary to the connection device of the drive base module, with a complementary drive-technological and/or complementary data-technological interface, wherein the complementary drive-technological and/or data-technological interface of the complementary connection device of the attachment device is provided for being connected to the drive-technological and/or data-technological interface of the connection device of the drive base module. It is conceivable for the attachment device to comprise an electronic unit that is data-technologically connectable to the drive base module via the complementary connection device of the attachment device, in particular by means of a connection of the complementary connection device of the attachment device and the connection device of the drive base module. Preferably, the electronic unit of the attachment device is provided for transmitting information to the drive base module by means of a contacting and/or contactless connection. Preferably, the interface of the connection device comprises at least one electrical contact for transmitting electrical signals and/or energy to at least one attachment device arranged at the connection device. It is conceivable for the data-technological interface of the connection device to have a multiplicity of electrical contacts, wherein at least one portion of the electrical contacts is used for digital and/or analog information transmission. "Data-technological" should be understood to mean, in particular, with a signal exchange, advantageously with a, preferably conductor-based, electrical signal exchange and/or with a, preferably wireless, signal exchange via electromagnetic waves.

In particular, the drive-technological interface of the connection device and/or of the complementary connection device has at least one force-locking and/or positively locking element and advantageously a plurality of force-locking and/or positively locking elements, which is/are preferably provided for supporting a torque. Advantageously, the drive-technological and/or data-technological interface of the connection device and/or of the complementary connection device has at least one electrical contact and particularly advantageously a plurality of electrical contacts, which is/are preferably provided for transmitting signals and/or data between the drive base module and the attachment device and/or for supplying the attachment device with electrical energy, in particular for a further drive unit integrated into the attachment device. Particularly advantageously, the drive-technological interface of the connection device and/or of the complementary connection device comprises at least one connection element, preferably latching element, and preferably a plurality of connection elements, preferably latching elements, which is/are provided for connecting the drive base module and the attachment device to one another in a force-locking and/or positively locking manner. In particular, the drive unit is provided for mechanically actuating the attachment device by means of the drive-technological interface of the connection device and by means of the drive-technological of the complementary connection device. Furthermore, an energy supply unit is provided, in particular, for supplying the attachment device with electrical energy by means of the drive-technological interface of the connection device and by means of the drive-technological interface of the complementary connection device. A "force-locking and/or positively locking element" should be understood to mean, in particular, an element which is provided at least for a releasable connection, wherein a holding force between two components is preferably transmitted by a geometric engagement of the components one in the other and/or a frictional force between the components. In this context, a "latching element" should be understood to mean, in particular, a spring-elastic means for producing a latching connection which is provided for being elastically deflected during mounting. "Couplable" should be understood to mean, in particular, releasably, advantageously manually releasably, connected and at least electrically and/or mechanically operatively connected.

In particular, the drive base module has at least one gearing unit. Advantageously, the gearing unit is mechanically coupled to the drive unit, preferably via a drive shaft of the drive unit and/or an input shaft of the gearing unit. Particularly advantageously, the gearing unit is arranged coaxially with respect to the drive unit. The gearing unit can comprise, in particular, at least one crank gearing, at least one cam gearing, at least one roller gearing and/or at least one ratchet gearing. Advantageously, the gearing unit comprises at least one wheel gearing, particularly advantageously toothed gearing, for example bevel gearing and/or preferably spur gearing, particularly preferably planetary gearing. Furthermore, the gearing unit advantageously comprises a plurality of shafts, particularly advantageously at least one input shaft and/or at least one output shaft. The gearing unit can be provided, in particular, at least for changing a rotation axis. Advantageously, the gearing unit is provided at least for changing a rotational speed and/or a torque.

In particular, the drive base module and/or the attachment device comprise(s) at least one metallic-coated visual component. Advantageously, the drive base module comprises at least two metallic-coated visual components. A "metallic-coated visual component" should be understood to mean, in particular, a component which is at least partly visible in a mounted state and which has at least one metallic coating whose surface in the mounted state contributes to a total visual area of the component at least to the extent of a significant portion, advantageously at least to the extent of 20% and preferably at least to the extent of 50%. A "metallic coating" should be understood to mean in particular, a coating with a metallic optical unit. In particular, the metallic coating can be embodied as a galvanic metal coating, as a PVD coating and/or as a metallic lacquer advantageously comprising a multiplicity of mica laminae and/or metal effect pigments, for example aluminum pigments and/or brass pigments. In particular, the surface of the metallic coating can be embodied as matt or lustrous. In particular, the visual component comprises a main body composed of plastic, on which the metallic coating is advantageously applied.

An "information output unit" should be understood to mean, in particular, a device provided for converting electronically encoded information into information that is perceptible, in particular acoustically or haptically perceptible, to the operator and is encoded in an interpretable manner. Preferably, the information output unit comprises at least one sound module and/or a vibration unit. Preferably, an acoustic output is effected as a speech output, as sound, as a sound sequence, as a melody or the like. The sound module is preferably embodied as a loudspeaker. A "vibration unit" should be understood to mean, in particular, a device that converts electrical energy into mechanical vibration energy. Preferably, the vibration unit is connected to a housing part of a housing of the drive base module without damping. The housing part is preferably embodied as a handle region. However, it is also conceivable for the housing part to have some other configuration which appears expedient to a person skilled in the art, in particular in the case of an integral configuration of a motor housing and a handle region. Preferably, speech that can be output by means of the information output unit can be set by the operator. It is also conceivable for the drive base module to comprise at least one electronic unit having at least one acoustic sensor element provided for detecting speech from the operator, wherein the speech that is able to be output by means of the information output unit is adaptable to the identified speech by means of the electronic unit. A "sensor element" should be understood to mean, in particular, an element provided for capturing at least one characteristic variable and/or a physical property, wherein the capture can take place actively, such as, in particular, by means of generating and emitting an electrical measurement signal, and/or passively, such as, in particular, by means of detecting property changes of a sensor component. Various sensor elements which appear expedient to the person skilled in the art are conceivable. It is likewise conceivable for the information output unit to be embodied in such a way that vibrations are generated by means of an excitation of the drive unit in order to output information acoustically and/or haptically such that the drive unit forms in particular a vibration unit of the information output unit. Furthermore, it is conceivable for the information output unit additionally to comprise a further sound module and/or a further vibration unit. The information output unit is preferably arranged partly at or in a housing of the drive base module. The housing is preferably provided for receiving and/or for mounting the drive unit and/or a gearing unit of the drive base module. However, it is also conceivable for the information output unit to be arranged at least partly at or in a handle region of the drive base module. Furthermore, it is conceivable to output information acoustically and/or haptically in the form of morse symbols by means of the information output unit.

Furthermore, it is proposed that the drive base module comprises at least one electronic unit at least for an open-loop and/or closed-loop control of the drive unit, wherein the information output unit is provided at least for outputting information acoustically and/or haptically at least depending on open-loop and/or closed-loop control characteristic variables of the drive unit that are settable by means of the electronic unit. As a result, an operator can advantageously be supplied with information regarding the drive unit. In particular, the activity carried out can be carried out particularly advantageously in a controlled manner. An "electronic unit" should be understood to mean, in particular, a unit which advantageously influences at least one electric current in a gas, in a conductor, in a semiconductor and/or in a vacuum. "Open-loop and/or closed-loop control of the drive unit" should be understood to mean, in particular, the open-loop and/or closed-loop control with regard to an open-loop and/or closed-loop control characteristic variable of the drive unit. Preferably, the open-loop and/or closed-loop control is effected at least with regard to a torque and/or a rotational speed of the drive unit. Outputting information "depending on open-loop and/or closed-loop control characteristic variables of the drive unit that are settable by means of the electronic unit", should be understood to mean, in particular, that information is output if a specific value of the open-loop and/or closed-loop control characteristic variable is attained and/or that the information content relates at least to the open-loop and/or closed-loop control characteristic variable, in particular to the value of the open-loop and/or closed-loop control characteristic variable. Preferably, information is output if a specific value of the open-loop and/or closed-loop control characteristic variable is attained. Preferably, the open-loop and/or closed-loop control characteristic variable is a torque and/or a rotational speed of the drive unit. Preferably, the information includes at least one value of the open-loop and/or closed-loop control characteristic variable. By way of example, it is conceivable that when a maximum torque of the drive unit that is desired by an operator is attained or exceeded, information is able to be output acoustically and/or haptically by means of the information output unit. Further outputs of acoustic and/or haptic information depending on open-loop and/or closed-loop control characteristic variables, which outputs appear expedient to a person skilled in the art, are likewise conceivable.

Furthermore, it is proposed that the drive base module comprises at least one electronic unit having at least one sensor element for detecting at least one connection characteristic variable of the interface wherein the information output unit is provided at least for outputting information acoustically and/or haptically at least depending on the detected connection characteristic variable. As a result, advantageously, a connection of an attachment device can be detected and the operator can be informed about a successful or deficient connection. Advantageously, a high operator control reliability can be produced and instances of incorrect operator control can advantageously be avoided. A "connection characteristic variable" should be understood to mean, in particular, an electrical and/or mechanical characteristic variable of an electrical and/or mechanical connection of an attachment device to the drive base module and/or a function/type of an attachment device connected to the drive base module. Preferably, in the case of a connection of an attachment device to the drive base module, an electrical circuit is closed, supplemented, completed and/or an electrical pushbutton and/or a mechanical encoding element is actuated. It is conceivable for the electrical circuit to be arranged partly in the attachment device and partly in the drive base module. The electrical circuit in the attachment device preferably completes and/or supplements the electrical circuit of the drive base module. It is likewise conceivable for the electrical circuit to be arranged completely in the drive base module. Furthermore, it is conceivable for the connection characteristic variable to be embodied as electronically stored information.

Furthermore, it is proposed that the information output unit is provided at least for outputting information acoustically and/or haptically at least depending on a function and/or a type of the attachment device arranged at the interface. As a result, an operator can particularly advantageously be informed about possible functions of an attachment device. Furthermore, preferably, the connection characteristic variable can be embodied as analog-encoded and/or digitally encoded information about the type and functions of a connected attachment device. It is conceivable, for example, for an electronic unit to determine the type and the functions of the attachment device on the basis of a connection characteristic variable and, by means of the information output unit to inform the operator acoustically, in particular by way of speech, about the type and function(s) of the connected attachment device. It is likewise conceivable for possible functions of an attachment device to be stored in an electronic memory unit. Likewise, an activated function of the attachment device can be signaled by the information output unit on account of a detection of a connection characteristic variable by means of the sensor element. It is conceivable, for example, to embody at least one connection characteristic variable as an electrical voltage that is variable by an electronic unit depending on the type and the function of the attachment unit, wherein specific functions are assigned to specific voltage values, as defined resistance. It is also conceivable for the drive base module and/or the attachment device to comprise at least one memory module in which the connection characteristic variable is stored as binary code, for example. Outputting information "depending on a function and/or type of the attachment device arranged at the interface" should be understood to mean, in particular, outputting information concerning a function and/or a type of the attachment device. Preferably, the operator can be informed about an activated function and/or about a change of function. Furthermore, it is conceivable for the drive base module to comprise at least one electronic unit having at least one sensor element for capturing a wear characteristic variable of the drive base module and/or of the attachment device. It is conceivable, for example, that when a wear limit is reached, an operator is informed about a possible functional failure.

Furthermore, it is proposed that the drive base module comprises at least one electronic unit having at least one sensor element for detecting at least one energy supply characteristic variable, wherein the information output unit is provided at least for outputting information acoustically and/or haptically at least depending on the detected energy supply characteristic variable. As a result, a user can particularly advantageously be informed about a state of the energy supply. A warning can advantageously be given in respect of an imminent interruption of the energy supply. An "energy supply characteristic variable" should be understood to mean, in particular, an electrical and/or electromechanical characteristic variable concerning at least the state of an energy supply. Preferably, the energy supply characteristic variable is embodied as electrical voltage, as electric current and/or as remaining capacity of an energy supply and/or as energy consumed by a consumer, in particular the drive unit or the electronic unit of the drive base module. The fact that information is output at least "depending on the detected energy supply characteristic variable" should be understood to mean that outputting information is instigated by a specific value of the detected energy supply characteristic variable being attained or the information content concerns the value of an energy supply characteristic variable. It is conceivable, for example, that in rechargeable battery operation of the drive base module, in the event of a specific remaining capacity of a rechargeable battery unit being undershot, the information output unit outputs the remaining capacity and/or remaining operating duration to an operator by means of an acoustic, in particular speech, and/or haptic output. Furthermore, it is conceivable that, during a charging process, the present rechargeable battery capacity is output to an operator by means of the at least one information output unit at temporally defined intervals and/or upon defined rechargeable battery capacities being attained. It is likewise conceivable that, in cable operation, the amount of energy consumed is ascertained and is output to an operator acoustically and/or haptically.

Furthermore, it is proposed that the drive base module comprises at least one reception and/or communication unit provided at least for reception of a radio signal and/or for communication with an external unit, wherein the information output unit is provided for outputting information acoustically and/or haptically at least depending on the received radio signal and/or on received electronic data. A "reception and/or communication unit" should be understood to mean, in particular, a unit which is provided at least for receiving electromagnetic signals, in particular radio signals, from external devices and/or communicating with external devices. Preferably, the at least one reception and/or communication unit is provided at least for establishing a communication link with portable electrical apparatuses, in particular with cellular phones, tablets, notebooks, computer apparatuses, miniaturized computer apparatuses and/or a network of portable electrical apparatuses, in particular the Internet and/or Internet-of-things. The communication link can be implemented in a radio standard, for example in a WLAN standard, Bluetooth, ZigBee, NFC, Z-Wave, EnOcean or the like. Radio links that use other radio standards are likewise conceivable. It is conceivable for the information output unit to output received electromagnetic signals, in particular radio signals, to the operator. It is likewise conceivable for the information output unit to output audio signals received by means of the reception and/or communication unit, in particular operating instructions and/or music.

Furthermore, it is proposed that the drive base module comprises at least one electronic unit having at least one sensor element for detecting a processing characteristic variable, wherein the information output unit is provided for outputting information acoustically and/or haptically at least depending on the detected processing characteristic variable. As a result, advantageously, a processing characteristic variable can be ascertained and output to the operator e.g. for the purpose of progress monitoring. Precise work monitoring can advantageously be effected. Preferably, the processing characteristic variable quantifies at least a drilling depth, a thickness of a removed, applied and/or processed layer of a workpiece, a size of an area of a removed, applied and/or processed layer of a workpiece, an orientation of an output axis of the drive unit with respect to a normal to a workpiece surface to be processed, a force acting during the processing, a torque acting during the processing, and/or a viscosity of a processed fluid. It is conceivable for the at least one sensor element to be embodied as an inertial sensor, as a distance sensor, in particular a laser distance sensor and/or a radio and/or ultrasonic distance sensor, a force sensor and/or a torque sensor. Other configurations of the sensor element that appear expedient to a person skilled in the art are also possible. Outputting information "depending on the detected processing characteristic variable" should be understood to mean, in particular, that information is output depending on at least one determined value of the processing characteristic variable. Preferably, a present value of a processing characteristic variable can be output. Furthermore, it is conceivable for the information output unit to output attainment of a set value of the processing characteristic variable. Furthermore, it is conceivable for the at least one electronic unit to interrupt at least an energy supply of the drive unit after attainment of a determined value of a processing characteristic variable.

Furthermore, it is proposed that the drive base module comprises at least one electronic unit having at least one memory, in particular a rewritable memory, for storing operator data, wherein the information output unit is provided for outputting information acoustically and/or haptically at least depending on the stored operator data. As a result, a personalization of the drive base module and high joy of use can advantageously be made possible. A "rewritable memory" should be understood to mean, in particular, a repeatedly writable electronic data memory. Preferably, the rewritable memory is embodied as a semiconductor memory. A "semiconductor memory" should be understood to mean, in particular, a memory that can permanently and/or volatilely store data at least on the basis of electronic semiconductor components. Preferably, the rewritable memory is embodied as DRAM, SRAM, EEPROM and/or flash EEPROM. "Operator data" should be understood to mean data that contain personal information of at least one operator. Preferably, the operator data comprise at least the surname, the first name, the date of birth and/or identification information, in particular a personal number.

Furthermore, it is proposed that the information output unit is provided at least for outputting at least three, in particular at least four and advantageously at least five, mutually different items of information acoustically and/or haptically, acoustic items of information. As a result, advantageously high user convenience, particularly advantageously a detailed and/or differentiated feedback to an operator, can be made possible. In particular, the mutually different items of information can comprise at least one item of switch-on information, at least one item of switch-off information, at least one item of mounting information, at least one item of demounting information, at least one item of mode change information, at least one item of charging cable connection information, at least one item of fault information and/or at least one item of charging information of the energy supply unit. Advantageously, the switch-on information informs an operator about a switching on of the drive base module and/or of the drive unit. Furthermore, the switch-off information advantageously informs an operator about switching off of the drive base module and/or of the drive unit. Furthermore, the mounting information advantageously informs an operator about a coupling of the drive base module and the attachment device. Moreover, the demounting information advantageously informs an operator about a decoupling of the drive base module and the attachment device. Furthermore, the mode change information advantageously informs an operator about a change in an operating mode of the drive unit, said change advantageously being brought about by the operator by means of an actuation element, particularly advantageously a second actuation element. Furthermore, the charging cable connection information advantageously informs an operator about a coupling and/or a decoupling of a charging cable and the drive base module. Furthermore, the fault information informs an operator about an operator control and/or operating fault, for example about pressing an actuation element in an uncoupled state of the drive base module and/or about an excessively low remaining capacity of the energy supply unit. Moreover, charging information of the energy supply unit informs an operator about a state of charge, for example about a concluded charging process, of the energy supply unit.

Alternatively or additionally, it is proposed that the drive base module comprises an, in particular gun-type, housing having at least two housing sections arranged in a manner angled with respect to one another, in particular a drive housing section and/or a handle housing section. As a result, advantageously, high operator control convenience can be achieved. Particularly advantageously, a high gripping flexible can be realized. Preferably, a plurality of gripping positions can be made possible. In particular, the drive housing section has at least substantially a shape of a hollow cylinder. Advantageously, the drive housing section has a cross section having at least substantially a shape of an annulus. Furthermore, advantageously, a longitudinal extension axis of the drive housing section is arranged at least substantially parallel to a rotation axis of the drive unit and/or of the gearing unit. In particular, at least a portion, advantageously at least half, of the drive unit is arranged within the drive housing section. Advantageously, at least a portion, particular advantageously at least a majority and very particularly advantageously the entirety, of the gearing unit is arranged within the drive housing section. In particular, the handle housing section of the housing has at least one handle surface which is advantageously provided for contact with at least one hand surface, preferably palm, of a user in at least one operating state. Preferably, at least part, particularly preferably at least a majority, of the energy supply unit is arranged within the handle housing section. In particular, a longitudinal extension axis of the drive housing section and a longitudinal extension axis of the handle housing section form an angle of at least 80°, particularly advantageously of at least 90° and particularly preferably of at least 100°, and/or of at most 170°, particularly advantageously of at most 140° and particularly preferably of at most 120°.

Advantageously, at least one part of the drive housing section and at least one part of the handle housing section are embodied in one piece, advantageously integrally. In particular, the housing is embodied in a multipartite fashion. Advantageously, the housing comprises at least one base and/or carrier housing and at least one housing attachment. Particularly advantageously, the base and/or carrier housing is embodied in a multipartite fashion and the base and/or carrier housing preferably comprises at least two half-shells. Preferably, the base and/or carrier housing comprises at least one visual surface and at least one carrier region. Preferably, the housing attachment is embodied as a visual component.

The fact that an, advantageously three-dimensional, object has "at least substantially a shape" of a reference object should be understood to mean, in particular, that the object deviates from the reference object with a proportion by volume of at most 15%, in particular of at most 10% and advantageously of at most 5%. The fact that an, advantageously two-dimensional, object has "at least substantially a shape" of a reference object should be understood to mean, in particular, that the object deviates from the reference object with an area proportion of at most 15%, in particular of at most 10% and advantageously of at most 5%. "At least substantially parallel" should be understood to mean, in particular, an orientation of a plane or of an axis relative to a reference plane or a reference axis, wherein in particular the plane and the reference plane, in particular as viewed in a sectional axis of the plane and the reference plane, the axis and the reference axis, in particular as viewed in a viewing axis perpendicular to the axis and perpendicular to the reference axis, or the plane and the reference axis or the axis and the reference plane, in particular as viewed in a viewing axis lying in the plane or reference plane and arranged perpendicular to the axis or reference axis, form an angle of in particular less than 8°, advantageously less than 5° and particularly advantageously less than 2°, and wherein advantageously the plane or the axis is arranged parallel to the reference plane or the reference axis. "At least substantially perpendicular" should be understood to mean, in particular, an orientation of a plane or of an axis relative to a reference plane or a reference axis, where in particular the plane and the reference plane, in particular as viewed in a sectional axis of the plane and the reference plane, the axis and the reference axis, in particular as viewed in a viewing axis perpendicular to the axis and perpendicular to the reference axis, or the plane and the reference axis or the axis and the reference plane, in particular as viewed in a viewing axis lying in the plane or reference plane and arranged perpendicular to the axis or reference axis, form an angle which deviates from 90° by in particular less than 8°, advantageously less than 5° and particularly advantageously less than 2°, and which is particularly preferably 90°. The expression "at least a majority" should be understood to mean, in particular, more than 50%, advantageously more than 65%, particularly advantageously more than 80% and particularly preferably more than 95%. "In one piece" should be understood to mean, in particular, at least cohesively connected, for example by means of a welding process, an adhesive-bonding process, a spray-on process and/or some other process that appears expedient to the person skilled in the art. Advantageously, in one piece should also be understood to mean integral. "Integral" should be understood to mean, in particular, shaped in one piece. Preferably, said one piece is produced from a single blank, one composition and/or one molding, particularly preferably in an injection-molding method, in particular a single- and/or multi-component injection-molding method.

Moreover, it is proposed that the drive base module comprises an energy supply unit, embodied in particular as a rechargeable battery unit, advantageously the energy supply unit mentioned above, having at least two energy storage cells, wherein a centroid axis through the centroids, in particular centers of volume and/or mass, of at least two of the energy storage cells and preferably of all of the energy storage cells forms an angle of at most 60°, in particular of at most 45° and advantageously of at most 30° with a main extension plane of the drive base module. As a result, in particular high user convenience, advantageously gripping convenience, can be made possible. Advantageously, a small grip width can be realized, such that, particularly advantageously, a gripping hand has to be spread only slightly. Furthermore, advantageously high safety, particularly advantageously gripping safety, can be made possible. Preferably, a high efficiency, advantageously structural space efficiency and/or mounting efficiency, can be achieved. Preferably, simple and/or fast mounting, particularly preferably of a motherboard and/or of energy storage cells, can be achieved. Particularly advantageously, the centroid axis is arranged at least substantially parallel to the main extension plane of the drive base module. In particular, the energy supply unit is provided for supplying at least the drive unit with energy, advantageously electrical energy. Particularly advantageously, the energy supply unit comprises at least two and preferably exactly two energy storage cells. Preferably, the energy storage cells are connected in series, preferably in order to enable a high voltage of an output current of the energy supply unit. Particularly preferably, the energy storage cells have substantially a shape of a circular cylinder. The energy storage cells are embodied preferably as battery cells and with preference as rechargeable battery cells. In particular, the energy storage cells can be embodied for example as alkaline-manganese, zinc-chloride, zinc-carbon, nickel-cadmium, nickel-iron, nickel-metal hydride, nickel-zinc, RAM and/or particularly advantageously lithium-ion cells. A "main extension plane" of an object or of a region should be understood to mean, in particular, a plane which is parallel to a largest side surface of a smallest imaginary parallelepiped which still just completely encloses the object or the region, and in particular passes through the midpoint of the parallelepiped.

It is furthermore proposed that the drive base module comprises an actuation unit, in particular a second actuation unit, having at least one actuation element, embodied in particular as a pushbutton, in particular a second actuation element, which is provided for manual selection of operating modes of the drive unit. As a result, advantageously high user convenience and/or a high flexibility, in particular a flexible adaptation of a drive unit to different attachment modules and/or fields of application, can be made possible. In particular, the actuation element is arranged in a curved transition region, advantageously in an outer region of a curved transition region, between the handle housing section and the drive housing section. Advantageously, the actuation element is arranged in at least one gripping position within thumb range. Advantageously, the actuation unit has a further actuation element, embodied in particular as a pushbutton, in particular additional second actuation element. Particularly advantageously, the actuation element and the further actuation element are embodied integrally. An "outer region" should be understood to mean, in particular, an outwardly curved and/or domed partial region of a curved and advantageously hose-shaped object. Preferably, the outer region is embodied complementarily to an inner region of the curved object.

Furthermore, it is proposed that the drive base module comprises a further actuation unit, in particular a first actuation unit, having at least two functionally redundant actuation surfaces for fundamentally different handlings. As a result, in particular, high user convenience can be realized, advantageously by means of a plurality of gripping positions. Particularly advantageously, a drive unit can be operated in different gripping positions by means of one and the same actuation unit. Preferably, a high range of use of a drive unit can be made possible. Furthermore, preferably a high flexibility, advantageously gripping and/or operator control flexibility, can be achieved. In particular, the further actuation unit is arranged at least partly in the curved transition region, advantageously in an inner region of the curved transition region. Advantageously, the actuation unit is provided for a manual setting of at least one drive parameter, advantageously a rotational speed, a torque and/or a drive power, of the drive unit. Advantageously, the further actuation unit has at least one additional actuation element, preferably a first actuation element, and advantageously at least one further additional actuation element, preferably a further first actuation element. An "actuation surface" should be understood to mean, in particular, a partial surface of an actuation element which is provided for finger contact in at least one gripping position for an actuation of the actuation element. "Fundamentally different handlings" should be understood to mean, in particular, at least two gripping positions of the drive base module, at least a portion, advantageously at least a majority and particularly advantageously the entirety of contact surfaces of a palm of the hand with the drive base module in the gripping positions being embodied as free of overlap. Advantageously, at least a first of the gripping positions is embodied as a gun grip and/or as a reverse gun grip. Particularly advantageously, in the first gripping position, at least a portion, preferably at least a majority, of a contact surface of a palm of the hand with the drive base module is arranged on the handle housing section. Furthermore, advantageously, at least a second of the gripping positions is embodied as a bar grip and/or as a reverse bar grip. Particularly advantageously, in the second gripping position, at least part, preferably at least a majority, of a contact surface of a palm of the hand with the drive base module is arranged on the drive housing section. The expression "at least a majority" should be understood to mean, in particular, more than 50%, advantageously more than 65%, particularly advantageously more than 80% and particularly preferably more than 95%. An "inner region" should be understood to mean, in particular, an inwardly curved and/or saddle-shaped partial region of a curved and advantageously hose-shaped object. Preferably, the inner region is embodied complementarily to an outer region of the curved object.

Furthermore, it is proposed that the drive base module has a maximum extension of at most 25 cm, in particular of at most 22 cm, advantageously of at most 20 cm and particularly advantageously of at most 19 cm. As a result, advantageously high user convenience, in particular simple handling, can be achieved. Furthermore, advantageously, a compact design can be made possible. Particularly advantageously, a high efficiency, in particular transport and/or storage efficiency, can be made possible. In particular, the maximum extension of the drive base module is embodied at least substantially as a spacing of a free end of the drive housing section and a free end of the handle housing section. In particular, perpendicular to the main extension plane of the drive base module, the drive base module has a maximum extension of at most 60 mm, advantageously of at most 55 mm, particularly advantageously of at most 51 mm and particularly preferably of at most 48 mm. Preferably, the maximum extension of the drive base module perpendicular to the main extension plane of the drive base module is embodied as a maximum extension of the drive housing section perpendicular to the main extension plane of the drive base module.

Moreover, it is proposed that the drive base module has a mass of at most 1000 g, in particular of at most 700 g, advantageously of at most 500 g and particularly advantageously of at most 350 g. As a result, advantageously high user convenience and particularly advantageously simple handling can be achieved. Preferably, fatigue of a gripping hand can be prevented.

Furthermore, it is proposed that the information output unit is arranged in a handle region, in particular in the handle region mentioned above. As a result, an advantageous field of view and/or sound field of an information output unit and/or an advantageously haptic coupling to a gripping hand of an operator can be achieved. Advantageously, the information output unit is arranged in a handle end region, particularly advantageously at a free end of the handle region. Preferably, the information output unit is arranged in the handle housing section, particularly preferably at a free end of the handle housing section.

Furthermore, the disclosure is based on a multifunctional machine, in particular a portable multifunctional machine and advantageously a handheld multifunctional machine, having at least one drive base module, in particular the drive base module mentioned above, and having at least one attachment device, in particular the attachment device mentioned above, wherein the information output unit is provided at least for outputting information to an operator acoustically and/or haptically at least depending on mounting and/or demounting of the drive base module and the attachment device and in particular depending on a type of the attachment device. As a result, advantageously, high work safety can be ensured. Particularly advantageously, an operator can be informed about a proper connection of a drive base module and an attachment device.

Furthermore, a method for acoustically and/or haptically outputting information by means of the information output unit of the drive base module, in particular of the drive base module according to the disclosure, having at least one connection device, having at least one attachment device and having at least one drive unit, is proposed. As a result, an operator can be supplied with information in a particularly convenient manner.

Moreover, it is proposed that in at least one method step information is output haptically and/or acoustically by means of an excitation of the drive unit brought about by the information output unit. As a result, advantageously, an information output unit can be combined with the drive unit and, in particular, weight can be saved and the number of components can be reduced.

Furthermore, it is proposed that in at least one method step information is output acoustically and/or haptically by means of the information output unit at least depending on an apparatus fault and/or operator control error that have/has occurred. As a result, advantageously, high work safety can be ensured.

Furthermore, it is proposed that in at least one method step information is output acoustically and/or haptically by means of the information output unit at least depending on a change of operating mode, in particular of the drive unit. In particular, the change of operating mode is initiated by an operator by means of an actuation element. As a result, an operator can advantageously be supplied with information about a function of a drive unit, particularly advantageously in a resting, preferably rotational-speed-free, state of the drive unit.

Furthermore, it is proposed that in at least one method step information is output acoustically and/or haptically by means of the information output unit at least depending on mounting and/or demounting of the interface and the attachment device and in particular depending on a type of the attachment device. As a result, advantageously, high work safety can be ensured. Particularly advantageously, an operator can be informed about a proper connection of an interface and an attachment device.

The drive base module according to the disclosure, the multifunctional machine according to the disclosure and/or the method according to the disclosure are/is intended here not to be restricted to the application and embodiment described above. In particular, the drive base module according to the disclosure, the multifunctional machine according to the disclosure and/or the method according to the disclosure, for fulfilling a functioning described herein, can have a number of individual elements, components and units and method steps that deviates from a number mentioned herein. Moreover, in the case of the value ranges indicated in this disclosure, values lying within the stated limits, too, are intended to be deemed to be disclosed and usable in any desired way.

BRIEF DESCRIPTION OF THE DRAWINGS

Further advantages are evident from the following description of the drawings. The drawings illustrate ten exemplary embodiments. The drawings, the description and the claims contain numerous features in combination. The person skilled in the art will expediently also consider the features individually and combine them to form practical further combinations.

In the figures:

FIG. 8 shows a perspective view of the energy storage unit and the motherboard in a mated state in a schematic illustration, FIG. 9 shows a perspective view of the energy storage unit and the motherboard in the mated state in a schematic illustration, FIG. 10 shows a perspective view of the energy storage unit and the motherboard in a separated state in a schematic illustration, FIG. 23 shows a perspective view of the drive module and a further attachment module coupled to the drive module and a second gripping position of the drive module in a schematic illustration, FIG. 24 shows a perspective view of the drive module and a further attachment module coupled to the drive module and a further second gripping position of the drive module in a schematic illustration, FIG. 25 shows the drive module in an opened state with a further first actuation element of the first actuation unit in an actuated state as viewed perpendicular to the main extension plane of the drive module in a schematic illustration.

DETAILED DESCRIPTION

Figure 1:
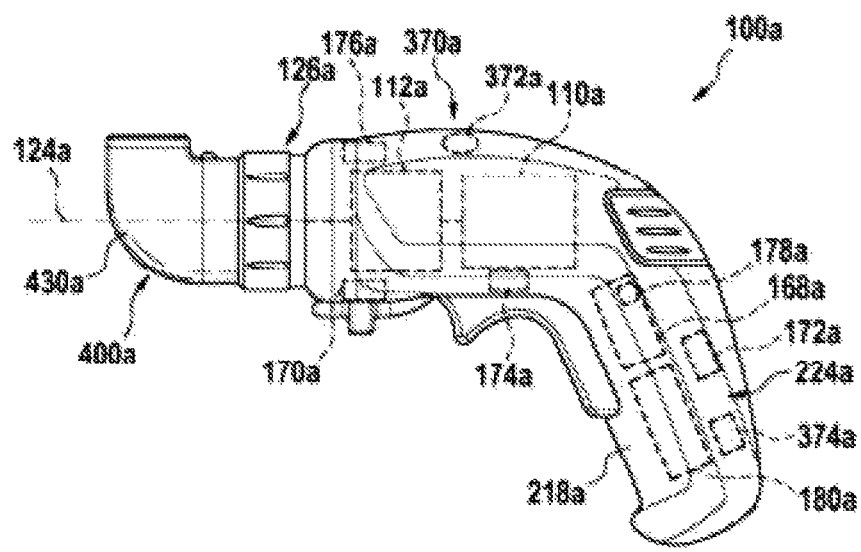
FIG. 1 shows a drive base module with an attachment device arranged thereon in a schematic illustration.

FIG. 1 shows a drive base module 100a and an attachment device 400a in a connected state. The drive base module 100a comprises at least one housing 218a embodied in particular in a gun-shaped fashion with a handle region 224a. However, it is also conceivable for the drive base module 100a to be embodied in a bar-shaped fashion, or to have a different shape than a gun and/or bar shape with a handle region 224a. The drive base module 100a comprises at least one connection device 126a having at least one drive-technological interface 128a and at least one data-technological interface 156a for connection to the attachment device 400a. However, it is also conceivable for the connection device 126a alternatively to have only the drive-technological interface 128a or only the data-technological interface 156a, in particular depending on a field of use of the drive base module 100a.

The drive base module 100a comprises at least one drive unit 110a for driving the attachment device 400a in a state in which the attachment device 400a is connected to the connection device 126a. The drive unit 110a is preferably embodied as an electric motor. However, it is also conceivable for the drive unit 110a to have some other configuration that appears expedient to a person skilled in the art. The drive base module 100a has a rotation axis 124a, in particular, about which the drive-technological interface 128a is drivable in a rotating manner, in particular by means of the drive unit 110a. Via a gearing unit 112a, not described in more specific detail here the drive unit 110a drives the drive-technological interface 128a of the connection device 126a. However, it is also conceivable for the drive base module 100a to be embodied in a manner decoupled from the gearing unit 112a and for the drive unit 110a to be provided for driving the drive-technological interface 128a directly.

The drive base module 100a preferably comprises an energy supply unit 180a at least for an energy supply of the drive unit 110a. The energy supply unit 180a is preferably embodied as a rechargeable battery unit. The energy supply unit 180a is arranged, in particular detachably, in the handle region 224a of the drive base module 100a. However, it is also conceivable for the energy supply unit 180a to have some other configuration that appears expedient to a person skilled in the art, such as, for example, a configuration as a power supply system cable, as a fuel cell or the like, or for the energy supply unit 180a to be integrated into the housing 218a or the like.

Furthermore, the drive base module 100a comprises at least one information output unit 370a provided at least for outputting information to an operator acoustically and/or haptically. The information output unit 370a comprises at least one sound module 372*a*, in particular a loudspeaker. The sound module 372*a* of the information output unit 370*a* is preferably arranged at least partly on an outer side of the housing 218*a*. Preferably, the sound module 372*a* is arranged on an outer side of the housing 218*a* facing away from the handle region 224*a*. However, it is also conceivable for the sound module 372*a* to be arranged on the housing 218*a* at some other position that appears expedient to a person skilled in the art. It is conceivable for the information output unit 370*a* to have at least one protective element (not illustrated in more specific detail here) provided for protecting the sound module 372*a* against penetration of dirt and/or against damage. The protective element can be embodied for example as a protective grid, as a protective film or the like that is arranged on the sound module 372*a*, in particular on the loudspeaker. It is likewise conceivable for the information output unit 370*a* to be provided for outputting information acoustically and/or haptically by means of an engendered excitation of the drive unit 110*a*.

In addition or as an alternative to the sound module 372*a*, the information output unit 370*a* can have a further sound module and/or a vibration unit 374*a*, in particular a vibration motor. The further sound module and/or the vibration unit 374*a* can be arranged in a handle region 224*a*, for example. Other positions of the further sound module and/or of the vibration unit 374*a* that appear expedient to a person skilled in the art are likewise conceivable.

The drive base module 100*a* comprises at least one electronic unit 168*a* at least for an open-loop and/or closed-loop control of the drive unit 110*a*. The information output unit 370*a* is provided at least for outputting information acoustically and/or haptically at least depending on open-loop and/or closed-loop control characteristic variables of the drive unit 110*a* that are settable by means of the electronic unit 168*a*. The open-loop and/or closed-loop control characteristic variable can be defined as a torque and/or a rotational speed of the drive unit 110*a*. Other open-loop and/or closed-loop control characteristic variables that appear expedient to a person skilled in the art are also conceivable.

The electronic unit 168*a* comprises at least one memory unit 178*a*, in particular a rewritable memory unit 178*a*, for storing operator data. The information output unit 370*a* is provided at least for outputting information acoustically and/or haptically at least depending on the stored operator data. The output is effected as speech output, in particular. Preferably, the information output unit 370*a* is provided for outputting the operator data and/or a personal greeting as speech by means of the sound module 372*a*. The memory unit 178*a* can be embodied as flash EEPROM. However, it is also conceivable for the memory unit 178*a* to have some other configuration that appears expedient to a person skilled in the art, such as, for example, as RAM/SRAM, EEPROM, or the like.

The electronic unit 168*a* comprises at least one sensor element 170*a* for detecting at least one connection characteristic variable of the drive-technological interface 128*a* and/or data-technological interface 156*a*. The information output unit 370*a* is provided at least for outputting information acoustically and/or haptically at least depending on the detected connection characteristic variable. Preferably, the output is effected as a speech output. Other output forms are also conceivable.

The sensor element 170*a* detects at least one function and/or a type of the attachment device 400*a* arranged at the connection device 126*a*. The information output unit 370*a* is provided at least for outputting information acoustically and/or haptically at least depending on a function and/or a type of the attachment device 400*a* arranged at the connection device 126*a*.

The sensor element 170*a* preferably detects a mechanical and/or electrical characteristic variable of a mechanical and/or electrical connection of the attachment device 400*a* to the drive base module 100*a* by means of the drive-technological and/or data-technological interface 128*a*, 156*a* of the connection device 126*a*. The sensor element 170*a* is connected to the data-technological interface 156*a*. The sensor element 170*a* preferably detects the presence and/or the connection status of a connection of the attachment device 400*a* to the drive base module 100*a*, the type of the connected attachment device 400*a*, provided functions of the attachment device 400*a* and/or an active function of the attachment device 400*a*. It is also possible for other connection characteristic variables that appear expedient to a person skilled in the art to be detected by means of the sensor element 170*a*. It is conceivable for the sensor element 170*a* to detect at least one portion of these data via the data-technological interface 156*a*.

Furthermore, the electronic unit 168*a* comprises at least one, in particular further, sensor element 172*a* for detecting an energy supply characteristic variable. The information output unit 370*a* is provided at least for outputting information acoustically and/or haptically at least depending on the detected energy supply characteristic variable. The, in particular further, sensor element 172*a* detects at least the supply voltage, the remaining capacity of the energy supply unit 180*a* and/or a consumed amount of energy. It is also conceivable for the, in particular further, sensor element 172*a* also to detect further energy supply characteristic variables that appear expedient to a person skilled in the art. It is conceivable for the information output unit 370*a* to inform the operator acoustically, in particular by speech, and/or haptically at least in the event of a defined value of the supply voltage and/or the remaining capacity being undershot and/or a specific energy consumption being exceeded.

The drive base module 100*a* comprises at least one reception and/or communication unit 176*a*. The reception and/or communication unit 176*a* is provided at least for reception of a radio signal and/or for communication with an external unit. The information output unit 370*a* is provided for outputting information acoustically and/or haptically at least depending on the received radio signal and/or on received electronic data. Preferably, the reception and/or communication unit 176*a* is provided for communicating at least with external units, in particular with portable electrical apparatuses, in particular with cellular phones, tablets, notebooks, computer apparatuses, miniaturized computer apparatuses and/or a network of portable electrical apparatuses, in particular the Internet and/or Internet-of-things. The reception and/or communication unit 176*a* is provided at least for receiving electronic data, in particular electronic data that can be played back.

The electronic unit 168*a* comprises at least one, in particular additional, sensor element 174*a* for detecting at least one processing characteristic variable. The information output unit 370*a* is provided at least for outputting information acoustically and/or haptically depending on the detected processing characteristic variable. The, in particular additional, sensor element 174*a* can be embodied in particular as an inertial sensor, as a distance sensor, in particular a laser distance sensor and/or a radio and/or ultrasonic distance sensor, a force sensor and/or a torque sensor. Other configurations that appear expedient to a person skilled in the art are also possible. The information output unit 370a is preferably provided for acoustically and/or haptically outputting the attainment and/or exceedance of a specific value of the processing characteristic variable and/or a proximity to a specific value of the processing characteristic variable.

A method for acoustically and/or haptically outputting information by means of the information output unit 370a of the drive base module 100a is described below. In the method for acoustically and/or haptically outputting information by means of the information output unit 370a of the drive base module 100a, information is output haptically and/or acoustically in at least one method step by means of an excitation of the drive unit 110a brought about by the information output unit 370a. In a method for acoustically and/or haptically outputting information by means of the information output unit 370a of the drive base module 100a, in at least one method step information is output haptically and/or acoustically at least depending on an apparatus fault and/or operator control error that have/has occurred.

Figure 2:
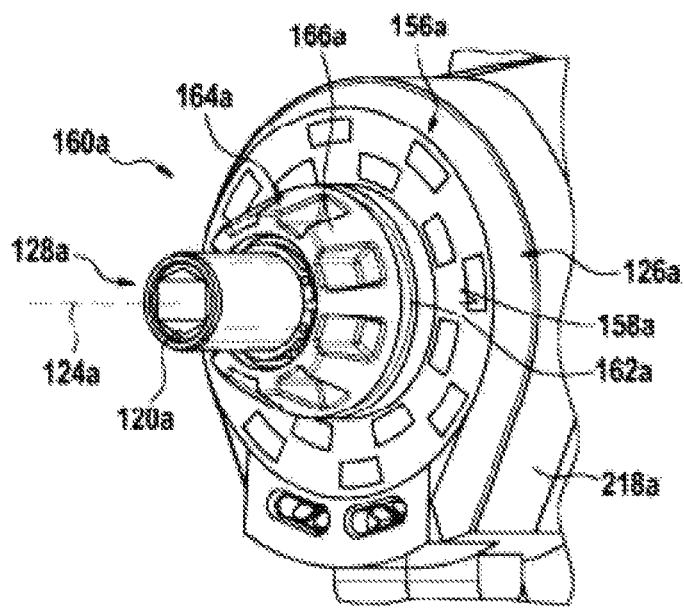
FIG. 2 shows a detail view of a connection device of the drive base module in a schematic illustration.

FIG. 2 illustrates a detail view of the connection device 126a of the drive base module 100a. The connection device 126a of the drive base module 100a comprises a locking unit 160a for locking the attachment device 400a. The locking unit 160a is arranged on the connection device 126a. The locking unit 160a is provided for locking a housing 430a of the attachment device 400a with the housing 218a of the drive base module 100a and/or with the connection device 126a. The locking unit 160a is provided for connecting the housing 430a of the attachment device 400a to the housing 218a of the drive base module 100a and/or to the connection device 126a securely against rotation. The locking unit 160a comprises at least one securing element 162a for axially securing a connection of the housing 218a of the drive base module 100a to the housing 430a of the attachment device 400a. In the present exemplary embodiment, the securing element 162a is embodied as a groove extending circumferentially in a circumferential direction. The securing element 162a is arranged on the housing 218a of the drive base module 100a. In an alternative configuration, the securing element 162a can be embodied as a rib and/or be arranged on the drive-technological interface 128a. The attachment device 400a comprises a latching element embodied in a manner corresponding to the securing element 162a and provided for engagement into the securing element 162a. The securing element 162a and the latching element form a positively locking and/or force-locking connection in a coupled state.

The attachment device 400a comprises an unlocking ring, not illustrated in more specific detail, for releasing the attachment device 400a from the drive base module 100a. In a connected state, the unlocking ring is arranged at an end of the attachment device 400a facing the drive base module 100a. The unlocking ring is arranged on the attachment device 400a in a manner mounted rotatably in a circumferential direction and is provided for manual operator control. The unlocking ring is provided for tensioning and for releasing the latching element for separating the attachment device 400a from the drive base module 100a.

The locking unit 160a has a further securing element 164a provided for rotational securing. In the present exemplary embodiment, the further securing element 164a is embodied in one piece with the housing 218a of the drive base module 100a. The further securing element 164a is embodied as a toothed rim and has, in particular, eight teeth 166a arranged in a manner distributed uniformly in a circumferential direction. However, it is also conceivable for the toothed rim to have a number of teeth 166a that is different than eight. For the sake of clarity, only one of the teeth 166a is provided with a reference sign. The attachment device 400a has a receptacle embodied in a manner corresponding to the further securing element 164a. In a coupled state, the further securing element 164a engages into the receptacle of the attachment device 400a. In a coupled state, the further securing element 164a transmits forces that act on the attachment device 400a in a circumferential direction to the housing 218a of the drive base module 100a. The latching means engages into the securing element 162a embodied as a groove and transmits forces that act on the attachment device 400a in an axial direction to the housing 218a of the drive base module 100a.

The drive-technological interface 128a of the connection device 126a has a cutout 120a having a hexagonal basic area at an end face of the connection device 126a. The attachment device 400a has a drive-technological interface, not illustrated in more specific detail, which is embodied such that it is insertable into the cutout 120a in a fitting manner. The attachment device 400a is driven in a positively locking manner. In principle, a cutout 120a having a different basic area than a hexagonal basic area is also conceivable. It is likewise conceivable for the cutout to be arranged in the drive-technological interface of the attachment device 400a, and for the drive base module 100a to have a drive-technological interface 128a shaped such that it is insertable in a positively locking manner.

As an alternative or in addition to the drive-technological interface 128a, the connection device 126a has the data-technological interface 156a. The data-technological interface 156a has a plurality of contact elements 158a embodied as contact pads. However, other configurations of contact elements, for example as pins or the like, are also conceivable, in principle. The attachment device 400a has corresponding contact elements. The contact elements 158a of the data-technological interface 156a are provided for contact with corresponding contact elements of the attachment device 400a. The contact elements 158a of the data-technological interface 156a are arranged in a plane whose normal is formed by the rotation axis 124a. The contact elements 158a of the data-technological interface 156a are at least partly connected to the sensor element 170a.

FIGS. 3 to 45 show nine further exemplary embodiments. The following descriptions and the drawings are essentially restricted to the differences between the exemplary embodiments, wherein, with regard to identically designated components, in particular in regard to components having identical reference signs, reference can also be made, in principle, to the drawings and/or the description of the other exemplary embodiments, in particular in FIGS. 1 and 2. For differentiation of the exemplary embodiments the letter a is appended to the reference signs of the exemplary embodiment in FIGS. 1 to 2. In the exemplary embodiments in FIGS. 3 to 45, the letter a is replaced by the letters b to j.

Figure 3:
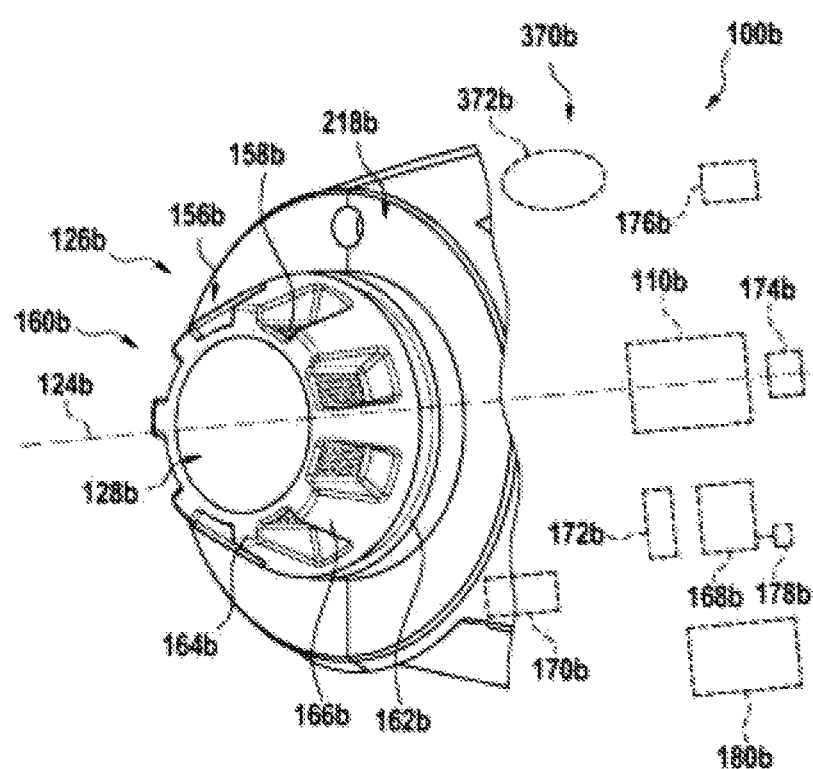
FIG. 3 shows a detail view of a connection device of an alternative drive base module in a schematic illustration.

FIG. 3 shows, in a schematic illustration, a configuration of a connection device 126b of an alternative configuration of a drive base module 100b according to the disclosure. The letter b is appended to the exemplary embodiment in FIG. 3.

Analogously to the previous exemplary embodiment, the drive base module 100b illustrated in FIG. 3, for connection to various attachment devices (not illustrated in more specific detail here), comprises at least the connection device 126b, which has at least one drive-technological interface 128b and/or a data-technological interface 156b for connection to at least one attachment device. Moreover, the drive base module 100b comprises at least one drive unit 110b for driving the attachment device in a state in which the attachment device is connected to the connection device 126b. Furthermore, the drive base module 100b comprises at least one information output unit 370b provided at least for outputting information to an operator acoustically and/or haptically. The information output unit 370b comprises at least one sound module 372b, in particular a loudspeaker. In addition or as an alternative to the sound module 372b, the information output unit 370b can comprise a further sound module (not illustrated in more specific detail) and/or a vibration unit (not illustrated in more specific detail). The vibration unit can be embodied as a vibration motor.

In contrast to the drive base module 100a illustrated in FIGS. 1 and 2, the alternative drive base module 100b illustrated in FIG. 3 comprises the connection device 126b comprising a locking unit 160b for locking the attachment device. The locking unit 160b is arranged on the connection device 126b. The locking unit 160b has an axial securing element 162b. The locking unit 160b has a further securing element 164b provided for rotational securing. In the present exemplary embodiment, the securing element 164b is embodied in one piece with the housing 218b of the drive base module 100b. The further securing element 164b is embodied as a toothed rim and has eight teeth 166b arranged in a manner distributed uniformly in a circumferential direction. A number of teeth 166b that is different than eight and/or a distribution of the teeth 166b that is different than a uniform distribution in a circumferential direction are/is also conceivable.

The drive-technological interface 128b is embodied as a receptacle, not illustrated in more specific detail, which is provided for receiving a drive shaft of the attachment device and for driving it in a positively locking manner. The data-technological interface 156b is integrated into the locking unit 160b. The data-technological interface 156b has eight contact elements 158b, each having a contact pad. However, a number of contact elements 158b that is different than eight and a configuration that is different than a contact pad, for example as a pin, are also possible. The contact pads are arranged in each case at radially outwardly oriented surfaces in interspaces between the teeth 166b of the securing element 164b.

The attachment device has a receptacle embodied in a manner corresponding to the further securing element 164b and having eight complementary mating teeth. In a coupled state, the further securing element 164b engages into the receptacle of the attachment device. The attachment device has two contact elements embodied in a manner corresponding to the contact elements 158b and arranged at radially inwardly directed surfaces of the complementary mating teeth. In a coupled state, the contact elements of the attachment device are respectively in contact with a contact element 158b of the data-technological interface 156b.

With regard to further features and functions of the drive base module 100b and/or the information output unit 370b, reference may be made to the description of the drive base module 100a illustrated in FIGS. 1 and 2 and/or the information output unit 370a illustrated in FIGS. 1 and 2, the description of which should be interpreted at least substantially analogously to the drive base module 100b and/or the information output unit 370b.

Hereinafter the term "drive module" should be understood synonymously with "drive base module". Furthermore, the term "attachment module" should be understood synonymously with "attachment device". Furthermore, the term "drive interface" should be understood synonymously with "drive-technological interface". Moreover, the term "housing unit" should be understood synonymously with "housing". Furthermore, the term "handle housing section" should be understood synonymously with "handle region". Furthermore, the term "energy storage unit" should be understood synonymously with "energy supply unit".

FIGS. 4 to 33 show a further exemplary embodiment. The letter c is appended to the exemplary embodiment in FIGS. 4 to 33. The further exemplary embodiment in FIGS. 4 to 33 differs from the previous exemplary embodiments at least substantially in terms of a configuration of a drive module 100c and an attachment module 400c.

Figure 4:
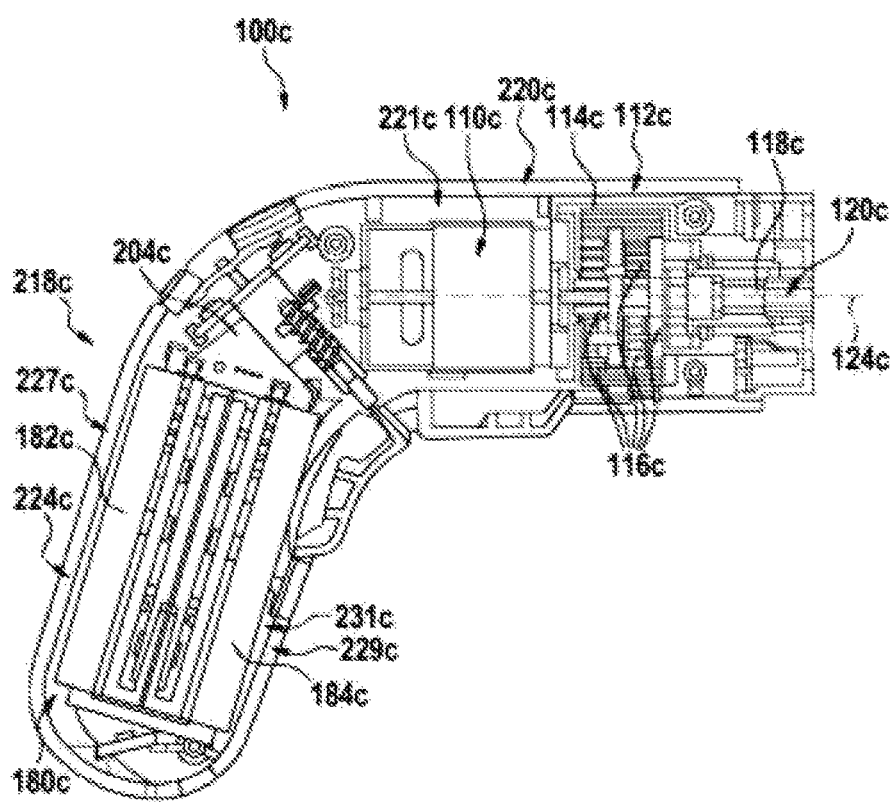
FIG. 4 shows the drive module in an opened state with a drive unit, with a gearing unit, with a part of a housing unit, with an energy storage unit, with a motherboard, with an information output unit, with a first actuation unit and with a second actuation unit, as viewed perpendicular to a main extension plane of the drive module in a schematic illustration.

FIG. 4 shows a drive module 100c. The drive module 100c is part of a tool module system 10c. The tool module system 10c is embodied as a kitchen tool module system 12c. The tool module system 10c is embodied as a hand tool module system. The tool module system 10c is embodied as a machine tool system. The tool module system 10c is embodied as an electric tool module system. The tool module system 10c is embodied as a portable tool module system. The tool module system 10c is embodied as a handheld tool module system. The tool module system 10c is provided for kitchen use. The tool module system 10c is provided for use in a living and/or eating area. The tool module system 10c is provided for use involving technical skill.

Figure 33:
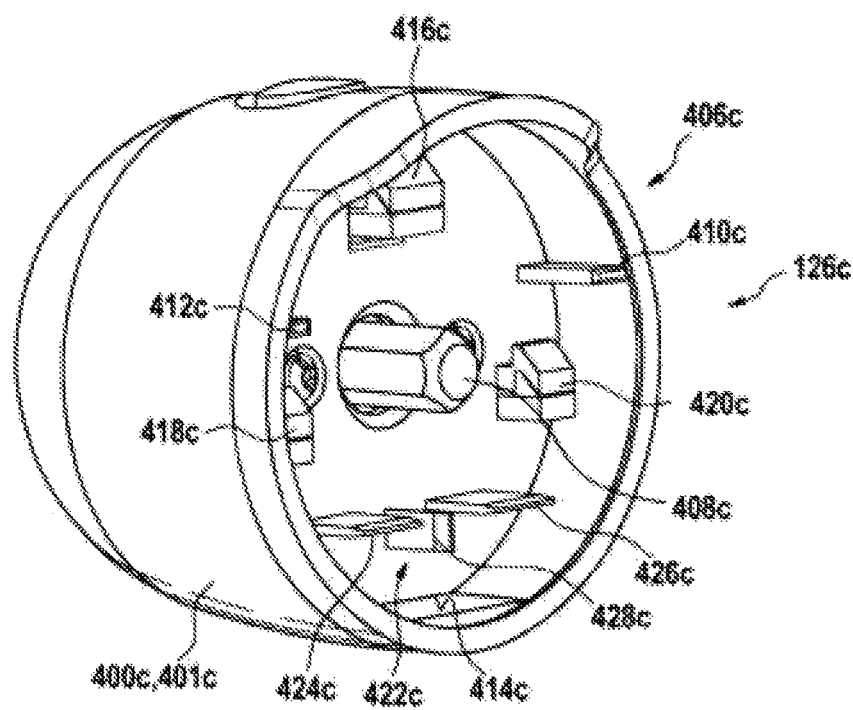
FIG. 33 shows a perspective view of the attachment device in a schematic illustration.

The tool module system 10c comprises the drive module 100c. The tool module system 10c comprises at least one attachment module 400c, 480c. The at least one attachment module 400c, 480c is couplable to the drive module 100c. The tool module system 10c comprises a plurality of attachment modules 400c, 480c. A first attachment module 400c of the tool module system 10c is illustrated in FIG. 33. The first attachment module 400c is embodied as a first tool module 401c. A second attachment module 480c of the tool module system 10c is shown in FIGS. 20, 21, 23 and 24. The second attachment module 480c is embodied as a second tool module 481c. The attachment modules 400c, 480c can be embodied as mixer attachments, as stirring attachments, as foaming attachments, as slicing and/or grating attachments, as chopping attachments and/or as grinding attachments.

The drive module 100c is embodied as a portable drive module. The drive module 100c is embodied as a handheld drive module. The drive module 100c has a mass of at most 1000 g, in particular of at most 700 g, advantageously of at most 500 g and particularly advantageously of at most 350 g. The drive module 100c has a maximum extension 108c, evident in FIG. 14, of at most 25 cm, in particular of at most 22 cm, advantageously of at most 20 cm and particularly advantageously of at most 19 cm. The drive module 100c has a maximum extent 108c of approximately 18.5 cm.

Figure 20:
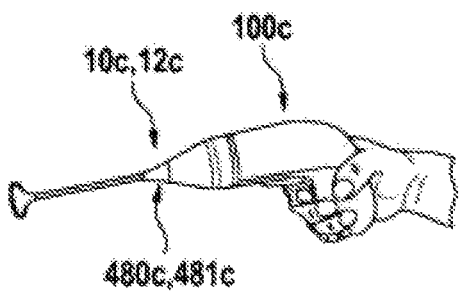
FIG. 20 shows a perspective view of the drive module and a further attachment module coupled to the drive module and a first gripping position of the drive module in a schematic illustration.
Figure 21:
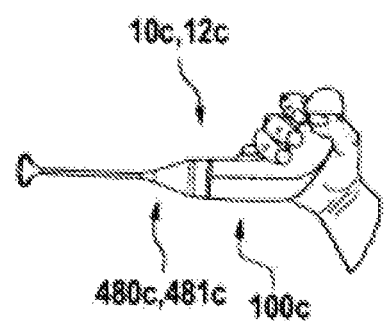
FIG. 21 shows a perspective view of the drive module and a further attachment module coupled to the drive module and a further first gripping position of the drive module in a schematic illustration.

The drive module 100c is grippable in a first gripping position. The first gripping position is illustrated in FIG. 20. The first gripping position is embodied as a gun grip. The drive module 100c is grippable in a further first gripping position. The further first gripping position is illustrated in FIG. 21. The further first gripping position is embodied as a reverse gun grip. The drive module 100c is grippable in a second gripping position. The second gripping position is illustrated in FIG. 23. The second gripping position is embodied as a bar grip, in particular a hand blender grip. The drive module 100c is grippable in a further second gripping position. The further second gripping position is illustrated in FIG. 24. The further second gripping position is embodied as a reverse bar grip, in particular a reverse hand blender grip.

The drive module 100c comprises a drive unit 110c. The drive unit 110c is illustrated in FIG. 4. The drive unit 110c is embodied as an electric machine. The drive unit 110c is embodied as an electric motor. The drive unit 110c comprises a rotor. Furthermore, the drive unit 110c comprises a stator. The drive unit 110c is provided for rotationally driving a drive shaft. The drive shaft is mounted rotatably about a rotation axis 124c.

The drive unit 110c has a plurality of operating functions. A first of the operating function is embodied as a counterclockwise rotation function. With an activated first operating function, the drive unit 110c is provided for moving the drive shaft in the counterclockwise direction as viewed in the output direction. At least one further first of the operating functions is embodied as a clockwise rotation function. With an activated further first operating function, the drive unit 110c is provided for moving the drive shaft in the clockwise direction as viewed in the output direction.

A second of the operating functions is embodied as an acceleration function. With an activated second operating function, the drive unit 110c is provided for moving the drive shaft with a rotational speed that is variably controllable by a user. A further second of the operating functions is embodied as a soft start function. With an activated further second operating function, the drive unit 110c is provided for moving the drive shaft with a rotational speed that is variably controllable by the user. Furthermore, with an activated soft start function, the drive unit 110c is provided for keeping an angular acceleration of the drive shaft below a positive limit value, particularly in the case of a fast rotational speed increase predefined by the user. With an activated soft start function, the drive unit 110c is provided for accelerating the drive shaft slowly up to a rotational speed predefined by the user. An additional second of the operating functions is embodied as a fixed rotational speed function. With an activated additional second operating function, the drive unit 110c is provided for moving the drive shaft with an invariable rotational speed, in particular at any desired rotational speed that is different than zero and is predefined by a user.

A third of the operating functions is embodied as a continuous rotational speed function. With an activated third operating function, the drive unit 110c is provided for moving the drive shaft with an unmodulated rotational speed. A further third of the operating functions is embodied as an alternating rotational speed function. With an activated further third operating function, the drive unit 110c is provided for changing continuously between the counterclockwise rotation function and the clockwise rotation function, in particular with deactivation of the pure counterclockwise rotation function and the pure clockwise rotation function. An additional third of the operating functions is embodied as a pulsating rotational speed function. With an activated additional third operating function, the drive unit 110c is provided for moving the drive shaft with a rotational speed that changes continuously between a minimum value, embodied in particular as zero, and a maximum value determinable by a user. A further additional third of the operating functions is embodied as a time-dependent rotational speed function. With an activated further additional third operating function, the drive unit 110c is provided for moving the drive shaft with a predefined, temporally repeated rotational speed profile.

A fourth of the operating functions is embodied as a full torque function. With an activated fourth operating function, the drive unit 110c is provided for moving the drive shaft with a maximum torque. A further fourth of the operating functions is embodied as a partial torque function. With an activated further fourth operating function, the drive unit 110c is provided for moving the drive shaft with a defined value of a torque, said value being different than a maximum value, in particular.

The drive unit 110c has at least two operating modes. The drive unit 110c has more than two operating modes. Each of the operating modes is composed of a combination of a plurality of the operating functions. Each of the operating modes is composed of a combination of at least two of the operating functions. An availability of the operating modes is dependent on a design and/or function of an attachment module coupled to the drive module 100c.

A first of the operating modes is available in a coupled state of the drive module 100c and an attachment module 400c, shown in FIG. 33 and embodied as a screwing module, in particular a screwdriver module. In the first operating mode, the first operating function and the second operating function are activated. A further first of the operating modes is available in the coupled state of the drive module 100c and the attachment module embodied as a screwing module. In the further first operating mode, the further first operating function and the second operating function are activated.

A second of the operating modes is available in a coupled state of the drive module 100c and an attachment module, not shown in more specific detail, said attachment module being embodied as a chopping module, in particular herb chopping module. In the second operating mode, the further first operating function and the additional second operating function are activated. A further second of the operating modes is available in the coupled state of the drive module 100c and the attachment module embodied as a chopping module. In the further second operating mode, the further first operating function and the additional second operating function are activated. In the further second operating mode, a rotational speed is higher than in the second operating mode. An additional second of the operating modes is available in the coupled state of the drive module 100c and the attachment module embodied as a chopping module. In the additional second operating mode, the further first operating function and the additional third operating function are activated.

A third of the operating modes is available in a coupled state of the drive module 100c and an attachment module, not shown in more specific detail, said attachment module being embodied as a grinding module, in particular spice grinding module. In the third operating mode, the further first operating function and the additional second operating function are activated.

A fourth of the operating modes is available in a coupled state of the drive module 100c and an attachment module, not shown in more specific detail, said attachment module being embodied as a slicing and/or grating module, in particular cheese grating module. In the fourth operating mode, the first operating function and the additional second operating function are activated. A further fourth of the operating modes is available in the coupled state of the drive module 100c and the attachment module embodied as a slicing and/or grating module. In the further fourth operating mode, the further first operating function and the additional second operating function are activated.

A fifth of the operating modes is available in a coupled state of the drive module 100c and an attachment module 480c shown in FIGS. 20, 21, 23 and 24 and embodied as a foaming module, in particular a milk foaming module. In the fifth operating mode, the further first operating function, the further second operating function and the additional second operating function are activated. A further fifth of the operating modes is available in the coupled state of the drive module 100c and the attachment module embodied as a foaming module. In the further fifth operating mode, the further first operating function, the further second operating function and the additional second operating function are activated. In the further fifth operating mode, a rotational speed is higher than in the fifth operating mode.

A sixth of the operating modes is available in a coupled state of the drive module 100c and an attachment module, not shown in more specific detail, said attachment module being embodied as a squeezer module, in particular a citrus squeezer module. In the sixth operating mode, the further first operating function and the additional second operating function are activated.

Alternatively, the drive unit 110c could have the operating modes listed in the first table below, depending on coupled attachment modules. In this case, the operating functions listed in the first table are always combined with the second operating function. By way of example, a second row of the first table should be understood as "A seventh operating mode, in particular a screwing-in operating mode, of the operating modes is available in a coupled state of the drive module 100c and an attachment module embodied as a screwdriver module. In the seventh operating mode, the further first operating function and the second operating function are activated."

The sixteenth operating mode, the seventeenth operating mode and the eighteenth operating mode are embodied as successive operating modes. In the seventeenth operating mode, the operating functions of the drive unit 110c are deactivated. In the seventeenth operating mode, the drive unit 110c has stopped. In the eighteenth operating mode, the drive unit 110c is provided for resetting a squeezing element, in particular a squeezing cone, of an attachment module embodied as a squeezer attachment, in particular a lemon squeezer attachment.

Furthermore, the drive unit 110c could have the operating modes listed in the second table below, depending on coupled attachment modules. In this case, the operating functions listed in the second table are always combined with the additional second operating function. By way of example, a second row of the second table should be understood as "A nineteenth operating mode, in particular a slow screwing-in operating mode, of the operating modes is available in a coupled state of the drive module 100c and an attachment module embodied as a screwdriver module. In the nineteenth operating mode, the further first operating function and the additional second operating function are activated." In an operating state with the additional remark "fast", the drive unit 110c in this case has a higher rotational speed than in a corresponding operating state with the additional remark "slow".

| Attachment module | Number of operating mode | Name of operating mode | Combined operating functions |
|---|---|---|---|
| Screwdriver attachment module | seventh | Screwing-in operating mode | further first |
| | eighth | Unscrewing operating mode | first |
| Chopping attachment module, in particular herb chopping attachment module | ninth | Chopping operating mode | further first |
| | tenth | Further chopping operating mode | further first and additional third |
| Grinding attachment, in particular spice grinding attachment | eleventh | Grinding operating mode | further first |
| Slicing and/or grating attachment, in particular cheese grating attachment | twelfth | Slicing and/or grating operating mode, advantageously grating operating mode | further first |
| | thirteenth | Further slicing and/or grating operating mode, advantageously further grating operating mode | |
| Foaming attachment, in particular milk foaming attachment | fourteenth | Stirring operating mode | further first |
| | fifteenth | Further stirring operating mode | first |
| Squeezer attachment, in particular citrus squeezer attachment | sixteenth | Squeezing operating mode | further first |
| | seventeenth | End position operating mode | |
| | eighteenth | Resetting operating mode | first |

| Attachment module | Number of operating mode | Name of operating mode | Combined operating functions |
|---|---|---|---|
| Screwdriver attachment module | Nineteenth | Slow screwing-in operating mode | further first |
| | Twentieth | Fast screwing-in operating mode | further first |
| | Twenty-first | Slow unscrewing operating mode | first |
| | Twenty-second | Fast unscrewing operating mode | first |
| Chopping attachment module, in particular herb chopping attachment module | Twenty-third | Slow chopping operating mode | further first |
| | Twenty-fourth | Fast chopping operating mode | further first |
| | Twenty-fifth | Further slow chopping operating mode | further first and additional third |
| | Twenty-sixth | Further fast chopping operating mode | further first and additional third |
| Grinding attachment, in particular spice grinding attachment | Twenty-seventh | Slow grinding operating mode | further first |
| | Twenty-eighth | Fast grinding operating mode | further first |
| Slicing and/or grating attachment, in particular cheese grating attachment | Twenty-ninth | Slow slicing and/or grating operating mode, in particular slow grating operating mode | further first |
| | Thirtieth | Fast slicing and/or grating operating mode, in particular fast grating operating mode | further first |

-continued

| Attachment module | Number of operating mode | Name of operating mode | Combined operating functions |
|---|---|---|---|
| | Thirty-first | Further slow slicing and/or grating operating mode, in particular further slow grating operating mode | first |
| | Thirty-second | Further fast slicing and/or grating operating mode, in particular fast grating operating mode | first |
| Foaming attachment, in particular milk foaming attachment | Thirty-third | Slow stirring operating mode | further first |
| | Thirty-fourth | Fast stirring operating mode | further first |
| | Thirty-fifth | Further slow stirring operating mode | first |
| | Thirty-sixth | Further fast stirring operating mode | first |
| Squeezer attachment, in particular citrus squeezer attachment | Thirty-seventh | Slow squeezing operating mode | further first |
| | Thirty-eighth | Fast squeezing operating mode | further first |
| | Thirty-ninth | End position operating mode | |
| | Fortieth | Slow resetting operating mode | first |
| | Forty-first | Fast resetting operating mode | first |

The thirty-seventh operating mode and/or the thirty-eighth operating mode, the thirty-ninth operating mode and the fortieth operating mode and/or forty-first operating mode are embodied as successive operating modes. In the thirty-ninth operating mode, the operating functions of the drive unit 110c are deactivated. In the thirty-ninth operating mode, the drive unit 110c has stopped. In the fortieth operating mode, the drive unit 110c is provided for resetting a squeezing element, in particular a squeezing cone, of an attachment module embodied as a squeezer attachment, in particular a lemon squeezer attachment. In the forty-first operating mode, the drive unit 110c is provided for resetting a squeezing element, in particular a squeezing cone, of an attachment module embodied as a squeezer attachment, in particular a lemon squeezer attachment.

The drive module 100c comprises a gearing unit 112c illustrated in FIG. 4. The gearing unit 112c is arranged coaxially with respect to the drive unit 110c. The gearing unit 112c is arranged coaxially with respect to the drive shaft. The gearing unit 112c is arranged coaxially with respect to the rotation axis 124c. The gearing unit 112c is disposed downstream of the drive unit 110c in the torque flow. The gearing unit 112c comprises a wheel gearing. The wheel gearing is embodied as a toothed gearing. The wheel gearing is embodied as a spur gearing. The wheel gearing is embodied as a planetary gearing. The gearing unit 112c comprises a plurality of gearing elements 116c, only some of which are provided with reference signs for the sake of clarity. The gearing elements 116c comprise shafts and wheels, in particular gearwheels and preferably spur wheels.

The gearing unit 112c comprises a gearing housing 114c. The gearing housing 114c encloses the gearing elements 116c. Alternatively, a gearing unit can be embodied as a crank gearing, as a cam gearing, as a roller gearing and/or as a ratchet gearing.

The gearing unit 112c is provided for changing a rotational speed. The gearing unit 112c is provided for changing a torque. The gearing unit 112c is provided for converting a rotational speed of the drive shaft to a rotational speed of a main output shaft 118c. The gearing unit 112c is provided for transmitting a torque from the drive shaft to the main output shaft 118c. Alternatively or additionally, a gearing unit can be provided for changing a rotation axis and/or a toothed gearing can be embodied as a bevel gearing.

The drive module 100c comprises the main output shaft 118c. The main output shaft 118c is arranged coaxially with respect to the drive unit 110c. The main output shaft 118c is arranged coaxially with respect to the drive shaft. The main output shaft 118c is arranged coaxially with respect to the gearing unit 112c. The main output shaft 118c is mounted rotatably about the rotation axis 120c. The main output shaft 118c is disposed downstream of the drive unit 110c in the torque flow. The main output shaft 118c is disposed downstream of the gearing unit 112c in the torque flow. The main output shaft 118c has a cutout 120c. An output-side end of the main output shaft 118c has the cutout 120c. The cutout 120c is embodied as a hexagonal cutout. The cutout 120c has a hexagonal cross section. The cutout 120c is provided for receiving a shaft.

The drive module 100c comprises a motherboard 204c. The motherboard 204c is shown in FIGS. 4 to 10. The motherboard 204c has a main extension plane 206c, which is evident in FIG. 7 and which forms an angle of at most 60° with a main extension plane 102c of the drive module 100c. The main extension plane 206c of the motherboard 204c and the main extension plane 102c of the drive module 100c are arranged parallel to one another. The main extension plane 206c of the motherboard 204c and the main extension plane 102c of the drive module 100c are arranged at a distance from one another. The main extension plane 206c of the motherboard 204c and the main extension plane 102c of the drive module 100c are at a distance of at least 5 mm. The main extension plane 206c of the motherboard 204c and the main extension plane 102c of the drive module 100c are at a distance of at most 15 mm.

The motherboard 204c has two partial sections 208c, 210c. The partial sections 208c, 210c are embodied integrally. The motherboard 204c has a first partial section 208c. The first partial section 208c has substantially a shape of a rectangle as viewed perpendicular to the main extension plane 206c of the motherboard 204c. The motherboard 204c has a second partial section 210c. The second partial section 210c has substantially a shape of a triangle, in particular of a right-angled triangle, as viewed perpendicular to the main extension plane 206c of the motherboard 204c. A hypotenuse of the second partial section 210c adjoins a short side edge of the first partial section 208c. An, in particular geometric, centroid of the second partial section 210c is arranged nearer to the drive unit 110c than an, in particular geometric, centroid of the first partial section 208c.

The motherboard 204c comprises three interfaces 212c, 214c, 216c. The interfaces 212c, 214c, 216c each have an interface opening. The interfaces 212c, 214c, 216c each have a conductor contact. The interfaces 212c, 214c, 216c are embodied as cable lugs. A first interface 212c of the interfaces 212c, 214c, 216c is arranged at a side of the first partial section 208c facing the second partial section 210c.

A second interface 214c of the interfaces 212c, 214c, 216c is arranged at a side of the first partial section 208c facing the second partial section 210c. A third interface 216c of the interfaces 212c, 214c, 216c is arranged at a side of the first partial section 208c facing away from the second partial section 210c. Alternatively, a motherboard could have a number of interfaces that is different than three.

The motherboard 204c can comprise at least one part of an electronic unit 168c, of a reception and/or communication unit 176c and/or a memory unit 178c. To that end, the motherboard 204c comprises a plurality of electronic components and/or assemblies, for example conductor tracks, capacitors, circuits, memory components and/or computing components, in particular microchips. The electronic components and/or assemblies have at least one signal transmission, energy storage, data storage, open-loop control, closed-loop control and/or calculation function.

The drive module 100c comprises an energy storage unit 180c. The energy storage unit 180c is shown in FIGS. 4 to 10. The energy storage unit 180c is embodied as an electrical energy storage unit. The energy storage unit 180c is embodied as a rechargeable energy storage unit. The energy storage unit 180c is embodied as a rechargeable battery unit, in particular lithium-ion rechargeable battery unit. The energy storage unit 180c is provided for supplying at least the drive unit 110c with energy, in particular electrical energy.

The energy storage unit 180c comprises a plurality of energy storage cells 182c, 184c. The energy storage unit 180c comprises two energy storage cells 182c, 184c. The energy storage unit 180c comprises exactly two energy storage cells 182c, 184c. Alternatively, an energy storage unit could also comprise more than two energy storage cells.

The energy storage unit 180c comprises a first energy storage cell 182c having a first centroid 194c, in particular first center of mass. The first energy storage cell 182c has substantially a shape of a cylinder. The first energy storage cell 182c is embodied as an electrical energy storage cell. The first energy storage cell 182c is embodied as a rechargeable energy storage cell. The first energy storage cell 182c is embodied as a rechargeable battery cell, in particular lithium-ion rechargeable battery cell.

The energy storage unit 180c comprises a second energy storage cell 184c having a second centroid 196c, in particular second center of mass. The second energy storage cell 184c is embodied as an electrical energy storage cell. The second energy storage cell 184c is embodied as a rechargeable energy storage cell. The second energy storage cell 184c is embodied as a rechargeable battery cell, in particular lithium-ion rechargeable battery cell. The second energy storage cell 184c has substantially a shape of a cylinder. A longitudinal extension axis 192 of the second energy storage cell 184c is arranged parallel to a longitudinal extension axis 190c of the first energy storage cell 182c.

The energy storage cells 182c, 184c comprise three plug contacts 198c, 200c, 202c, which are illustrated in FIG. 10. The three plug contacts 198c, 200c, 202c correspond to the interfaces 212c, 214c, 216c. The first energy storage cell 182c comprises a first plug contact 198c of the plug contacts 198c, 200c, 202c. The first plug contact 198c corresponds to the first interface 212c. The first plug contact 198c and the first interface 212c are provided for a first plug connection. The second energy storage cell 184c comprises a second plug contact 200c of the plug contacts 198c, 200c, 202c. The second plug contact 200c corresponds to the second interface 214c. The second plug contact 200c and the second interface 214c are provided for a second plug connection. The first energy storage cell 182c and the second energy storage cell 184c comprise a common third plug contact 202c of the plug contacts 198c, 200c, 202c. The third plug contact 202c is arranged at an opposite end of the first energy storage cell 182c relative to the first plug contact 198c. The third plug contact 202c is arranged at an opposite end of the second energy storage cell 182c relative to the second plug contact 200c. The third plug contact 202c corresponds to the third interface 216c. The third plug contact 202c and the third interface 216c are provided for a third plug connection.

Figure 5:
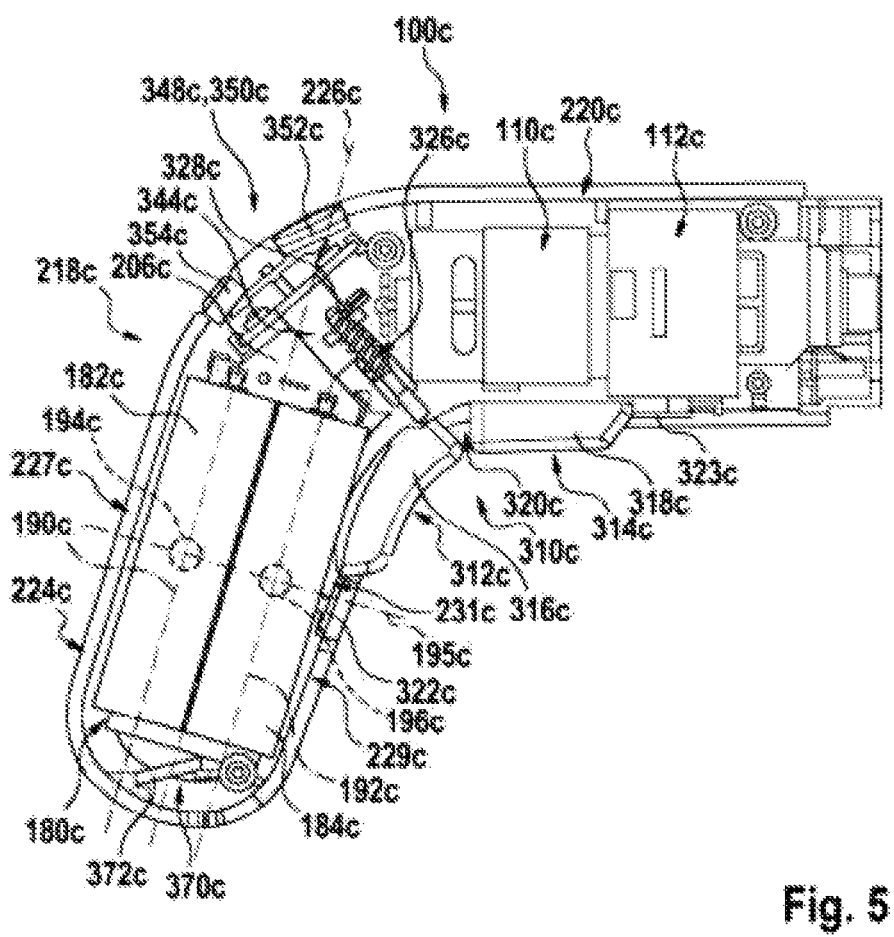
FIG. 5 shows the drive module in the opened state as viewed perpendicular to the main extension plane of the drive module in a schematic illustration.
Figures 6, 7:
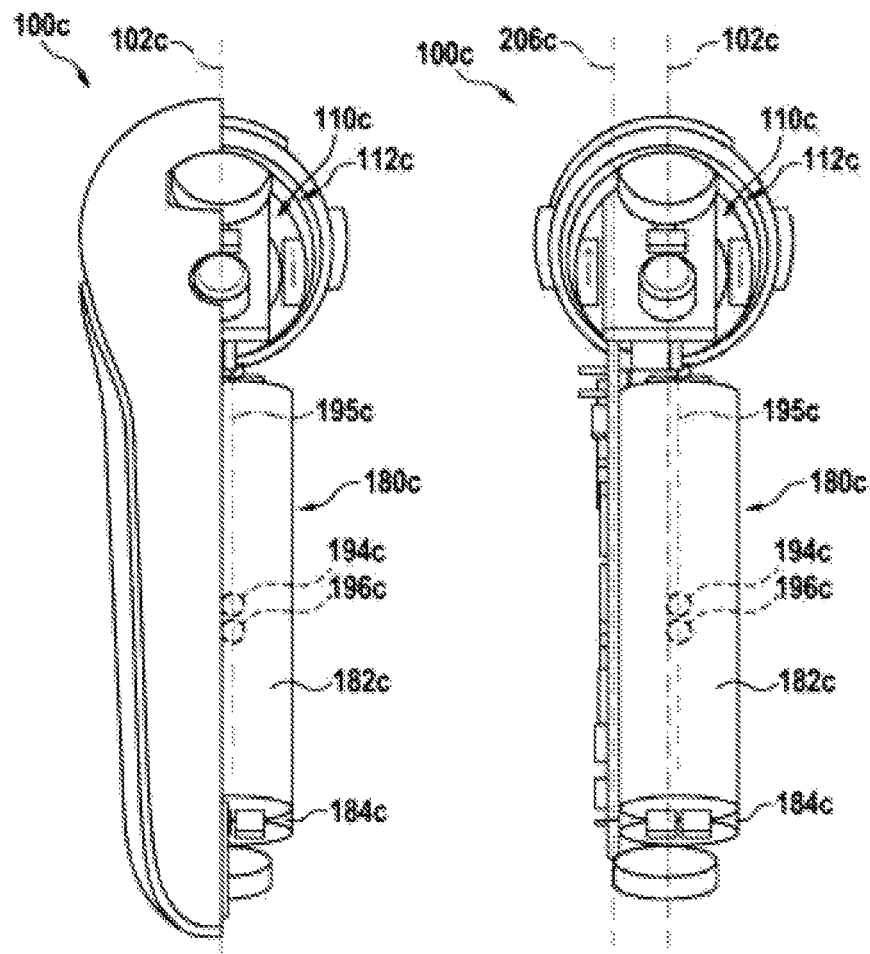
FIG. 6 shows the drive module in the opened state as viewed in the direction of a rotation axis of the drive unit in a schematic illustration.
FIG. 7 shows the drive module without the housing unit as viewed in the direction of the rotation axis of the drive unit in a schematic illustration.

FIGS. 5, 6 and 7 illustrate a centroid axis 195c through the first centroid 194c of the first energy storage cell 182c and through the second centroid 196c of the second energy storage cell 184c. The centroid axis 195c forms an angle of at most 60° with a main extension plane 102c of the drive module 100c. The centroid axis 195c is arranged parallel to the main extension plane 102c of the drive module 100c. The centroid axis 195c is arranged at a distance from the main extension plane 102c of the drive module 100c. The centroid axis 195c is at a distance of more than 1 mm from the main extension plane 102c of the drive module 100c. The centroid axis 195c is at a distance of less than 3 mm from the main extension plane 102c of the drive module 100c. The centroid axis 195c is at a distance of approximately 2 mm from the main extension plane 102c of the drive module 100c.

A maximum number of energy storage cells 182c, 184c of the energy storage unit 180c that are arranged one behind another perpendicular to the main extension plane 102c of the drive module 100c is one. The first energy storage cell 182c and the second energy storage cell 184c are arranged without any overlap as viewed perpendicular to the main extension plane 102c of the drive module 100c. Consequently, the first energy storage cell 182c and the second energy storage cell 184c are able to be plugged onto the motherboard 204c independently of one another. A maximum number of energy storage cells 182c, 184c of the energy storage unit 180c that are arranged one behind another in the main extension plane 102c is two. The first energy storage cell 182c and the second energy storage cell 184c are arranged one behind another in the main extension plane 102c. The maximum number of energy storage cells 182c, 184c arranged one behind another perpendicular to the main extension plane 102c of the drive module 100c is less than the maximum number of energy storage cells 182c, 184c arranged one behind another in the main extension plane 102c.

The drive module 100c comprises a housing unit 218c. The housing unit 218c is illustrated in greater detail in FIGS. 11 to 19. The housing unit 218c is embodied in a gun-shaped fashion. The housing unit 218c is embodied in a multipartite fashion. The housing unit 218c consists at least partly of a plastic, in particular a thermoplastic, and preferably of acrylonitrile-butadiene-styrene copolymer (ABS). At least a majority of the housing unit 218c consists of a plastic, in particular of a thermoplastic and preferably of ABS. The housing unit 218c has a maximum extension 228c of at most 18 cm parallel to the rotation axis 124c, said maximum extension being shown in FIG. 14. The housing unit 218c has a maximum extension 228c of approximately 15.3 cm parallel to the rotation axis 124c. The housing unit 218c has a maximum extension 230c of at most 15 cm perpendicular to the rotation axis 124c. The housing unit 218c has a maximum extension 230c of approximately 12.1 cm perpendicular to the rotation axis 124c.

Figure 13:
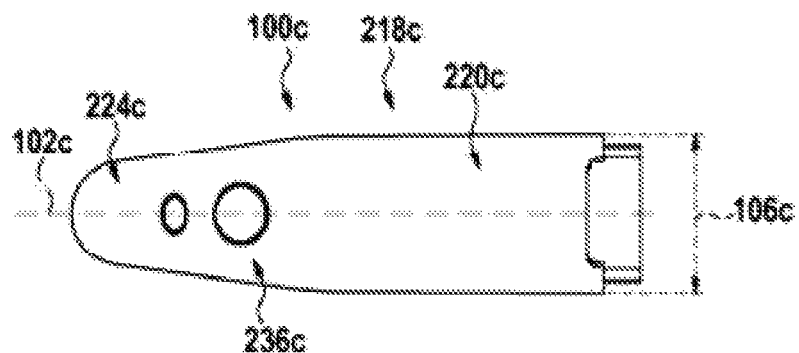
FIG. 13 shows the drive module as viewed perpendicular to the rotation axis of the drive unit and in the main extension plane of the drive module in a schematic illustration.

The housing unit 218c comprises a drive housing section 220c. The drive housing section 220c has substantially a shape of a hollow cylinder. A cross section through the drive housing section 220c perpendicular to a longitudinal extension axis 222c of the drive housing section 220c has substantially a shape of an annulus. A longitudinal extension of the drive housing section 220c is greater than an average diameter of the drive housing section 220c. A longitudinal extension of the drive housing section 220c is less than double the diameter of the drive housing section 220c. An extension 106c of the drive housing section 220c perpendicular to the main extension plane 102c of the drive module 100c, said extension being shown in FIG. 13, is at most 55 mm. The extension 106c of the drive housing section 220c perpendicular to the main extension plane 102c of the drive module 100c is approximately 55 mm.

The drive housing section 220c encloses the drive unit 110c shown in FIG. 4. A longitudinal extension axis 222c of the drive housing section 220c is arranged substantially parallel to the rotation axis 124c. A cavity 221c is arranged between the drive housing section 220c and the drive unit 110c. The drive housing section 220c encloses the gearing unit 112c shown in FIG. 4. The drive housing section 220c is arranged substantially coaxially with respect to the gearing unit 112c.

The housing unit 218c comprises a handle housing section 224c. The handle housing section 224c tapers along a longitudinal extension axis 226c of the handle housing section 224c continuously toward a free end 225c of the handle housing section 224c. The handle housing section 224c tapers continuously toward the free end 225c as viewed in the centroid axis 195c.

A cross section through the handle housing section 224c perpendicular to the longitudinal extension axis 226c of the handle housing section 224c has substantially a shape of an oval ring. The handle housing section 224c has a maximum extension 104c of at most 44 mm perpendicular to the main extension plane 102c of the drive module 100c, said extension being shown in FIG. 12. The handle housing section 224c has an extent 104c of approximately 35 mm perpendicular to the main extension plane 102c of the drive module 100c. The handle housing section 224c has a maximum extension 232c of at most 60 mm parallel to the centroid axis 195c, said maximum extension being shown in FIG. 14. The handle housing section 224c has a maximum extension 232c of approximately 45 mm parallel to the centroid axis 195c. The maximum extension 104c of the handle housing section 224c perpendicular to the main extension plane 102c of the drive module 100c is less than the maximum extension 232c of the handle housing section 224c parallel to the centroid axis 195c.

The handle housing section 224c encloses a majority of the motherboard 204c shown in FIG. 4. The handle housing section 224c encloses a majority of the energy storage unit 180c. An outer narrow side 227c of the handle housing section 224c contacts the first energy storage cell 182c. An inner narrow side 229c of the handle housing section 224c is separated from the second energy storage cell 184c by a cavity 231c. The longitudinal extension axis 226c of the handle housing section 224c is arranged at least substantially parallel to the longitudinal extension axis 190c of the first energy storage cell 182c. The longitudinal extension axis 226c of the handle housing section 224c is arranged substantially parallel to the longitudinal extension axis 192c of the second energy storage cell 184c. The longitudinal extension axis 226c of the handle housing section 224c is arranged at least substantially perpendicular to the centroid axis 195c.

Figure 14:
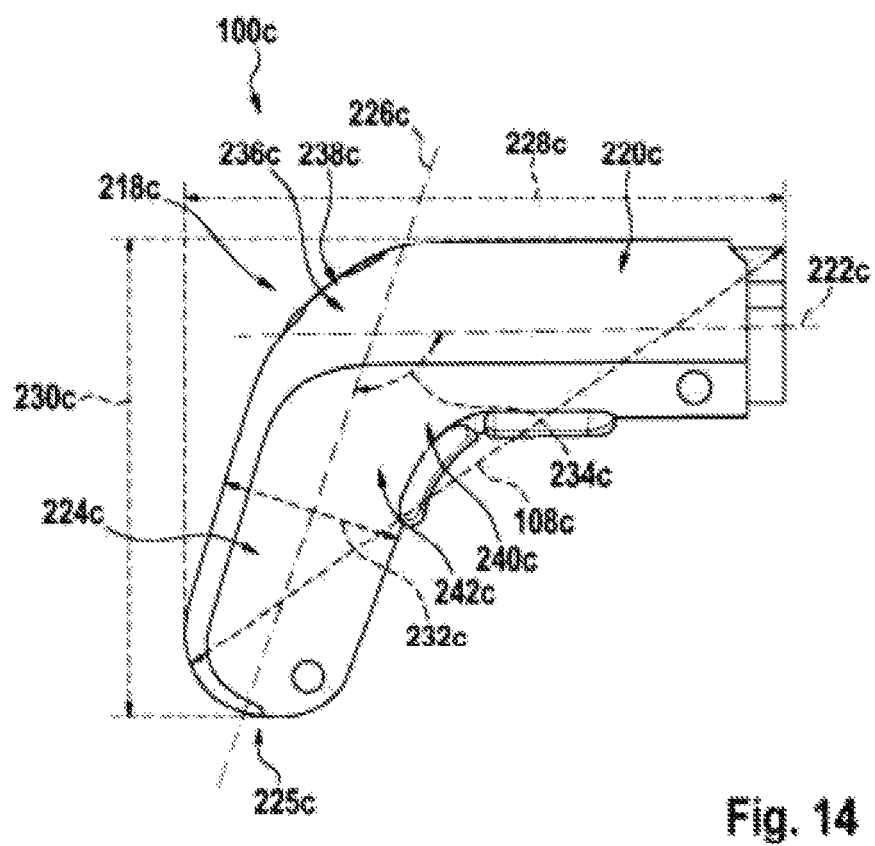
FIG. 14 shows the drive module as viewed perpendicular to the main extension plane of the drive module in a schematic illustration.
Figure 15:
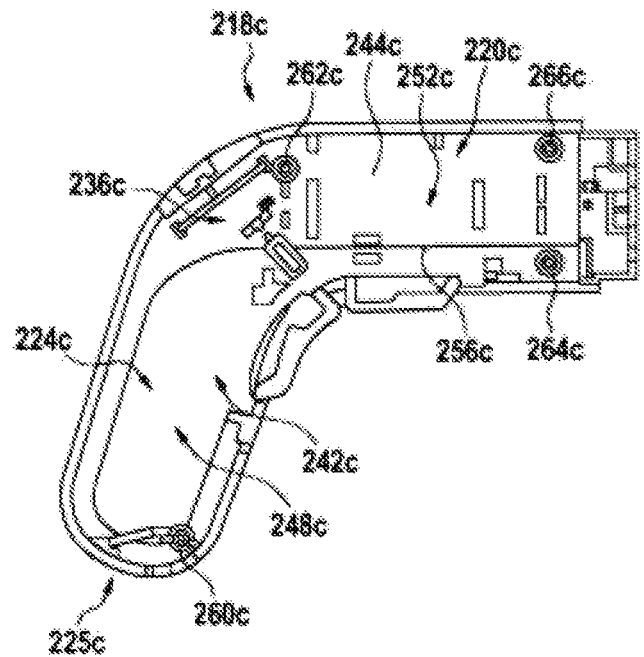
FIG. 15 shows the housing unit in an opened state as viewed perpendicular to the main extension plane of the drive module in a schematic illustration.
Figure 16:
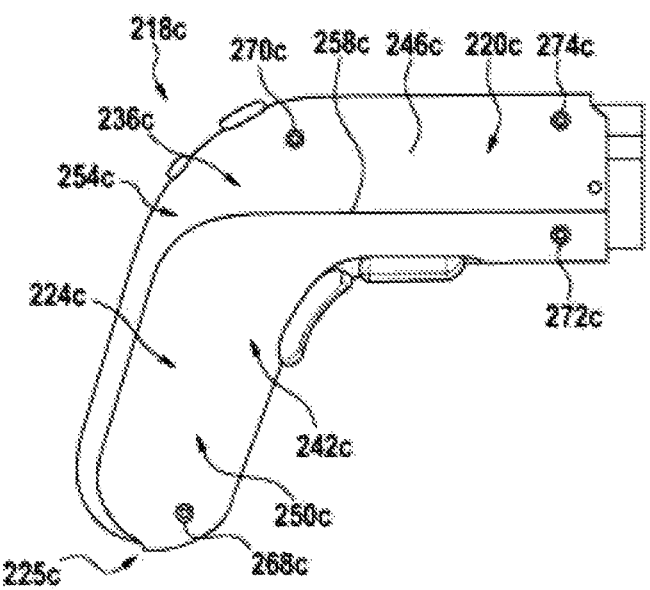
FIG. 16 shows a base housing of the housing unit as viewed perpendicular to the main extension plane of the drive module in a schematic illustration.

The handle housing section 224c is arranged in an angled manner with respect to the drive housing section 220c. An internal angle 234c between the longitudinal extension axis 222c of the drive housing section 220c and the longitudinal extension axis 226c of the handle housing section 224c, said internal angle being shown in FIG. 14, is at least 80°. The internal angle 234c is at most 170°. The internal angle 234c is approximately 110°. The drive housing section 220c and the handle housing section 224c span the main extension plane 102c of the drive module 100c.

A curved transition region 236c is arranged between the handle housing section 224c and the drive housing section 220c. The handle housing section 224c and the drive housing section 220c are connected via the transition region 236c. A longitudinal end of the handle housing section 224c and of the drive housing section 220c respectively adjoins the transition region 236c. The drive housing section 220c and the transition region 236c are embodied partly integrally. The handle housing section 224c and the transition region 236c are embodied partly integrally. The drive housing section 220c, the transition region 236c and the handle housing section 224c are embodied partly integrally. The transition region 236c comprises a convexly curved outer region 238c. The transition region 236c comprises an inner region 240c curved in a saddle-shaped fashion.

The housing unit 218c comprises a base housing 242c. The base housing 242c extends over the drive housing section 220c. The base housing 242c extends over the handle housing section 224c. The base housing 242c extends over the transition region 236c. At least a majority of the base housing 242c consists of a plastic, in particular a thermoplastic. The base housing 242c completely consists of a plastic, in particular a thermoplastic.

The base housing 242c is provided for fixing functional elements, in particular all functional elements of the drive module 100c. The base housing 242c is provided for fixing the motherboard 204c. The base housing 242c is provided for fixing the drive unit 110c. The base housing 242c is provided for fixing the gearing unit 112c.

The base housing 242c has a visual region 248c, 250c. The visual region 248c, 250c is visible in a mounted state of the drive module 100c. The visual region 248c, 250c extends over the drive housing section 220c, in particular in the mounted state of the drive module 100c at an underside of the drive housing section 220c, preferably relative to the first gripping position. The visual region 248c, 250c extends over the handle housing section 224c, in particular in the mounted state of the drive module 100c at a front side of the handle housing section 224c, said front side preferably facing away from a user in the first gripping position. The visual region 248c, 250c extends over the transition region 236c, in particular the inner region 240c of the transition region 236c.

The base housing 242c has a carrier region 252c, 254c. The carrier region 252c, 254c is concealed in the mounted state of the drive module 100c. The carrier region 252c, 254c extends over the drive housing section 220c, in particular in the mounted state of the drive module 100c at a top side of the drive housing section 220c, preferably relative to the first gripping position. The carrier region 252c, 254c extends over the handle housing section 224c, in particular in the mounted state of the drive module 100c at a rear side of the handle housing section 224c, said rear side preferably facing a user in the first gripping position. The carrier region 252c, 254c extends over the transition region 236c, in particular the outer region 238c of the transition region 236c.

The base housing 242c has a housing step 256c, 258c. The visual region 248c, 250c and the carrier region 252c, 254c are separated from one another by the housing step 256c, 258c. The visual region 248c, 250c rises relative to the carrier region 252c, 254c at the housing step 256c, 258c.

Figure 29:
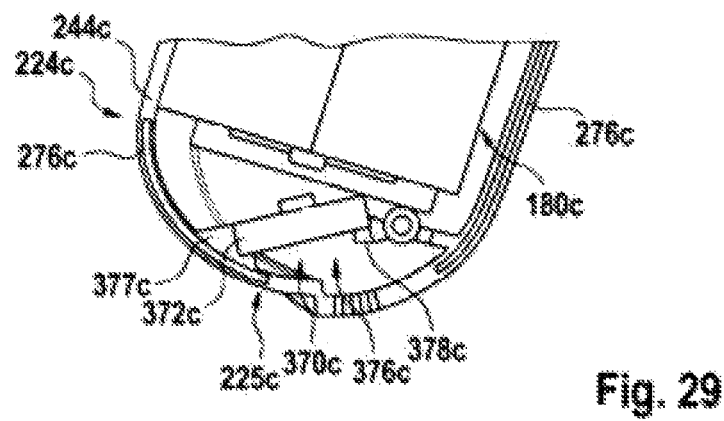
FIG. 29 shows a detail view of the information output unit in a mounted state in a schematic illustration.

The base housing 242c is embodied in a multipartite fashion. The base housing 242c is embodied in a bipartite fashion. The base housing 242c comprises a first base housing component 244c. At least a majority of the first base housing component 244c consists of a plastic, in particular a thermoplastic. The first base housing component 244c consists of a plastic, in particular a thermoplastic. The first base housing component 244c is embodied as a first half-shell. The first base housing component 244c is delimited approximately by the main extension plane 102c of the drive module 100c in the mounted state of the drive module 100c. The first base housing component 244c has a plurality of first positively locking and/or frictionally locking elements 276c. The first positively locking and/or frictionally locking elements 276c are illustrated in FIG. 29. The first positively locking and/or frictionally locking elements 276c are arranged at a housing edge between a concave housing inner side and a convex housing outer side of the first base housing component 244c.

The first base housing component 244c has a first visual region 248c. The first base housing component 244c has a first carrier region 252c. The first visual region 248c and the first carrier region 252c are separated from one another by a first housing step 256c. The first visual region 248c rises relative to the first carrier region 252c at the first housing step 256c.

The first base housing component 244c comprises a plurality of receptacle elements 260c, 262c, 264c, 266c. The first base housing component 244c comprises four receptacle elements 260c, 262c, 264c, 266c. A first receptacle element 260c of the receptacle elements 260c, 262c, 264c, 266c is part of a last third of the handle housing section 224c comprising the end 225c. The first receptacle element 260c is part of the first visual region 248c. A second receptacle element 262c of the receptacle elements 260c, 262c, 264c, 266c is part of the outer region 238c of the transition region 236c. The second receptacle element 262c is part of the first carrier region 252c. A third receptacle element 264c of the receptacle elements 260c, 262c, 264c, 266c is part of a half of the drive housing section 220c facing away from the transition region 236c. The third receptacle element 266c is part of the first visual region 248c. A fourth receptacle element 266c of the receptacle elements 260c, 262c, 264c, 266c is part of the half of the drive housing section 220c facing away from the transition region 236c. The fourth receptacle element 266c is part of the first carrier region 252c.

The receptacle elements 260c, 262c, 264c, 266c are embodied substantially identically in respect of shape and function. By way of example, the first receptacle element 260c is described in greater detail below. The features of the first receptacle element 260c are analogously applicable to the second receptacle element 262c, to the third receptacle element 264c and to the fourth receptacle element 266c.

The first receptacle element 260c is embodied as a first screw dome. The first receptacle element 260c is incorporated into a housing shell of the first base housing component 244c. The first receptacle element 260c is provided for receiving a first connection element, in particular a bolt and/or a screw. The first receptacle element 260c encloses a first cutout having substantially a shape of a circular cylinder. The first cutout, in particular in a demounted state of the first base housing component 244c, is accessible from a housing inner side of the first base housing component 244c.

The base housing 242c comprises a second base housing component 246c. At least a majority of the second base housing component 246c consists of a plastic, in particular a thermoplastic. The second base housing component 246c consists of a plastic, in particular a thermoplastic. The second base housing component 246c is embodied as a second half-shell. The second base housing component 246c is delimited approximately by the main extension plane 102c of the drive module 100c in the mounted state of the drive module 100c. The first base housing component 244c and the second base housing component 246c are embodied substantially mirror-symmetrically with respect to one another. The second base housing component 246c comprises a plurality of second positively locking and/or frictionally locking elements, not shown in more specific detail. The second positively locking and/or frictionally locking elements are arranged at a housing edge between a concave housing inner side and a convex housing outer side of the second base housing component 246c. The second positively locking and/or frictionally locking elements correspond to the first positively locking and/or frictionally locking elements 276c. The first positively locking and/or frictionally locking elements 276c and the second positively locking and/or frictionally locking elements are provided for a frictionally locking and/or positively locking connection of the first base housing component 244c and the second base housing component 246c.

The second base housing component 246c has a second visual region 250c. The second base housing component 246c has a second carrier region 254c. The second visual region 250c and the second carrier region 254c are separated from one another by a second housing step 258c. The second visual region 250c rises relative to the second carrier region 254c at the second housing step 258c.

The second base housing component 246c comprises a plurality of further receptacle elements 268c, 270c, 272c, 274c. The second base housing component 246c comprises four further receptacle elements 268c, 270c, 272c, 274c. A first further receptacle element 268c of the further receptacle elements 268c, 270c, 272c, 274c is part of the last third of the handle housing section 224c comprising the end 225c. The first further receptacle element 268c is part of the second visual region 250c. A second further receptacle element 270c of the further receptacle elements 268c, 270c, 272c, 274c is part of the outer region 238c of the transition region 236c. The second further receptacle element 270c is part of the second carrier region 254c. A third further receptacle element 272c of the receptacle elements 268c, 270c, 272c, 274c is part of a half of the drive housing section 220c facing away from the transition region 236c. The third further receptacle element 272c is part of the second visual region 250c. A fourth further receptacle element 274c of the receptacle elements 268c, 270c, 272c, 274c is part of the half of the drive housing section 220c facing away from the transition region 236c. The fourth further receptacle element 274c is part of the second carrier region 254c.

The further receptacle elements 268c, 270c, 272c, 274c are embodied substantially identically in respect of shape and function. By way of example, the first further receptacle element 268c is described in greater detail below. The features of the first further receptacle element 268c are analogously applicable to the second further receptacle element 270c, to the third further receptacle element 272c and to the fourth further receptacle element 274c.

The first further receptacle element 268c is embodied as a first further screw dome. The first further receptacle element 268c is incorporated into a housing shell of the second base housing component 246c. The first further receptacle element 268c is provided for receiving the first connection element, in particular a first screw element. The first further receptacle element 268c corresponds to the first receptacle element 260c. The first further receptacle element 268c encloses a first further cutout having substantially a shape of a circular cylinder. The first further cutout, in particular in the demounted state of the second base housing component 246c, is accessible from a housing inner side of the second base housing component 246c. The first further cutout, in particular in the demounted state of the second base housing component 246c, is accessible from a housing outer side of the second base housing component 246c. During mounting, the first connection element is able to be introduced into the first cutout of the first receptacle element 260c through the first further cutout of the first further receptacle element 268c.

The first visual region 248c and the second visual region 250c form the visual region 248c, 250c of the base housing 242c in a connected state of the first base housing component 244c and the second base housing component 246c. The first carrier region 252c and the second carrier region 254c form the carrier region 252c, 254c of the base housing 242c in a connected state of the first base housing component 244c and the second base housing component 246c. The first housing step 256c and the second housing step 258c form the housing step 256c, 258c of the base housing 242c in a connected state of the first base housing component 244c and the second base housing component 246c.

Figure 11:
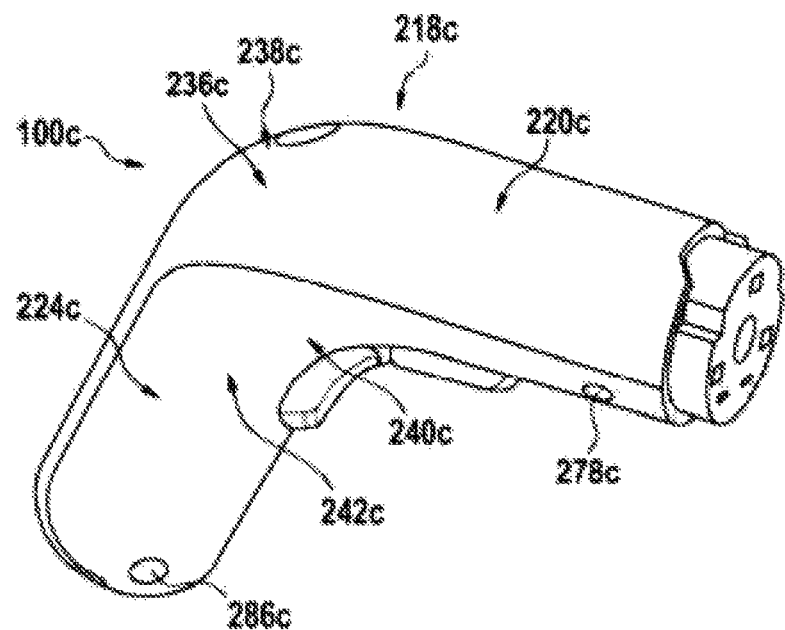
FIG. 11 shows a perspective view of the drive module in a schematic illustration.
Figure 12:
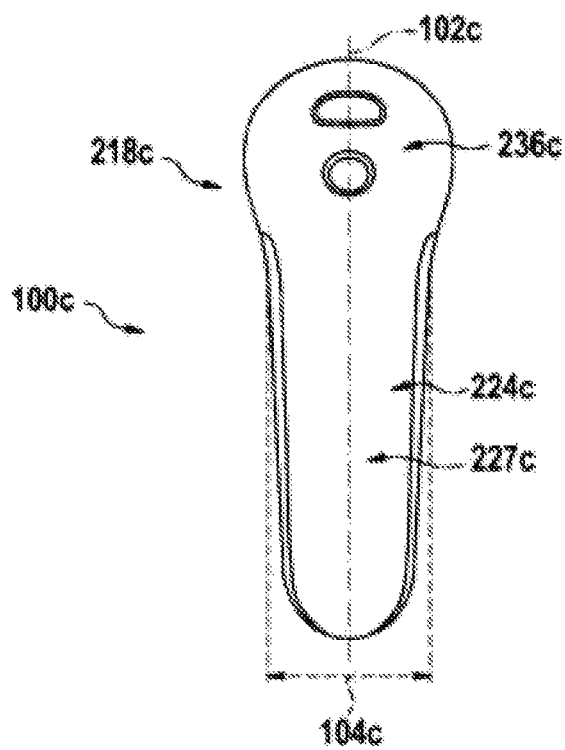
FIG. 12 shows the drive module as viewed in the direction of the rotation axis of the drive unit in a schematic illustration.
Figure 19:
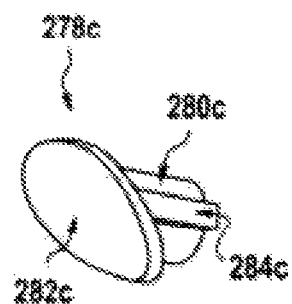
FIG. 19 shows a perspective view of a lining unit of the base housing in a schematic illustration.

The base housing 242c comprises a first lining unit 278c. The first lining unit 278c is illustrated in FIGS. 11 and 19. The first lining unit 278c is embodied in one piece, in particular integrally. The first lining unit 278c is embodied as a first stopper. The first lining unit 278c is provided for lining and/or covering the third further receptacle element 272c. The first lining unit 278c is provided for protecting the third further receptacle element 272c against contamination.

The first lining unit 278c comprises a first main body 280c. The first lining unit 278c comprises a first covering element 282c. The first covering element 282c has a first curved viewing surface. The curvature of the first viewing surface is adapted to a curvature of the second base housing component 246c in a surrounding region of the first further receptacle element 268c. The first lining unit 278c comprises a first guide element 284c. The first guide element 284c is embodied as a guide rib. The first guide element 284c is embodied as a mounting rib. The first guide element 284c is provided for guiding the first lining unit 278c during mounting on the first further receptacle element 268c in a corresponding housing cutout.

The base housing 242c comprises a second lining unit 286c. The second lining unit 286c is illustrated in FIG. 11. The second lining unit 286c substantially corresponds to the first lining unit 278c. The second lining unit 286c is provided for lining and/or covering the first further receptacle element 268c. The second lining unit 286c is provided for protecting the first further receptacle element 268c against contamination. The second lining unit 286c has dimensions deviating from the first lining unit 278c. A second curved viewing surface of a second covering element of the second lining unit is adapted to a curvature of the second base housing component 246c in a surrounding region of the third further receptacle element 272c. As a result, fast mounting can advantageously be achieved. Particularly advantageously, incorrect mounting of a lining unit can be prevented.

Figure 17:
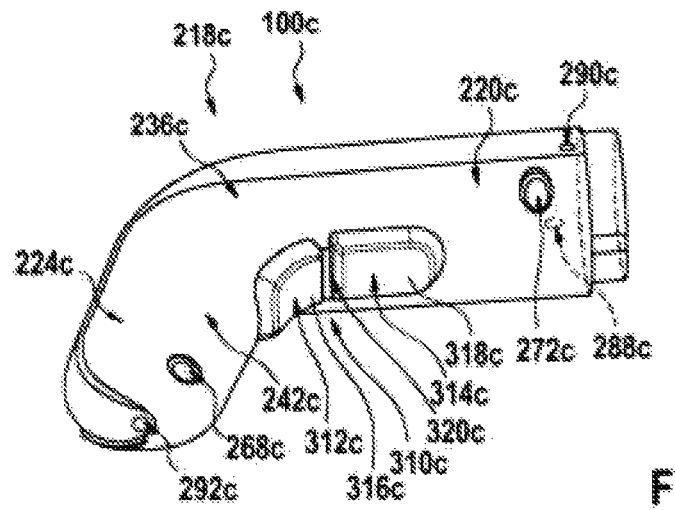
FIG. 17 shows a perspective view of the base housing in a schematic illustration.

The base housing 242c comprises a plurality of cutouts 288c, 290c, 292c. The cutouts 288c, 290c, 292c are illustrated in FIG. 17. The base housing 242c comprises three cutouts 288c, 290c, 292c. The cutouts 288c, 290c, 292c are incorporated into the carrier region 252c, 254c of the base housing 242c. A first cutout 288c of the cutouts 288c, 290c, 292c is incorporated into the first base housing component 244c. The first cutout 288c is arranged in a last quarter of the drive housing section 220c facing away from the transition region 236c. A second cutout 290c of the cutouts 288c, 290c, 292c is incorporated into the second base housing component 246c. The second cutout 290c is arranged in the last quarter of the drive housing section 220c facing away from the transition region 236c. A third cutout 292c of the cutouts 288c, 290c, 292c is incorporated by half in each case into the first base housing component 244c and into the second base housing component 246c. The third cutout 292c is arranged at the end 225c of the handle housing section 224c.

The drive module 100c comprises two visual components 294c, 350c. The two visual components 294c, 350c are embodied as metallic-coated visual components. The two visual components 294c, 350c are embodied as metal-coated visual components. The two visual components 294c, 350c are embodied as electrolytically coated visual components.

Figure 18:
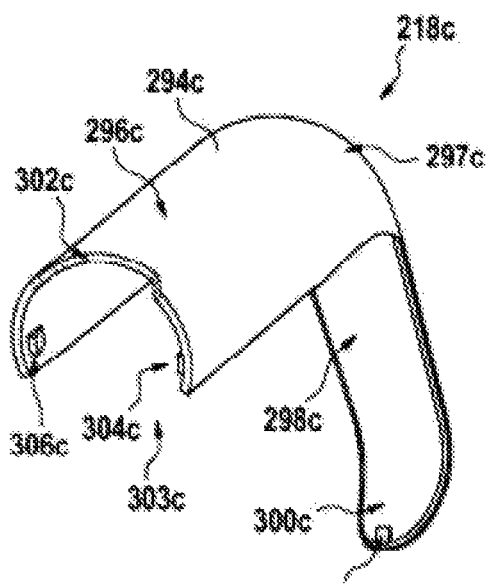
FIG. 18 shows a perspective view of a visual component of the housing unit in a schematic illustration.

The drive module 100c comprises a first visual component 294c. The first visual component is illustrated in FIG. 18. The first visual component 294c is embodied as a metallic-coated visual component. The first visual component 294c is embodied as a metal-coated visual component. The first visual component 294c is embodied as an electrolytically coated visual component.

The housing unit 218c comprises a first visual component 294c. The first visual component 294c is embodied as a housing attachment. The first visual component 294c covers the carrier region 252c, 254c of the base housing 242c in a mounted state. The first visual component 294c and the visual region 248c, 250c of the base housing 242c form a majority of a visual surface of the drive module 100c. A visual surface of the first visual component 294c corresponds to at least 30% of the visual surface of the drive module 100c. The visual surface of the first visual component 294c corresponds to at most 90% of the visual surface of the drive module 100c. The first visual component 294c conceals at least one housing connection in a mounted state. The first visual component 294c conceals the second further receptacle element 270c in the mounted state. The first visual component 294c conceals the fourth further receptacle element 274c in the mounted state. The first visual component 294c is provided for protecting the second further receptacle element 270c against contamination. The first visual component 294c is provided for protecting the fourth further receptacle element 274c against contamination.

The first visual component 294c comprises a main body. The main body of the first visual component 294c consists of a plastic, in particular of a thermoplastic and preferably of ABS. The first visual component 294c has at least one metallic coating, in particular metal coating. The first visual component 294c has a plurality of metal coatings, in particular electrolytic coatings. The first visual component 294c has a matt surface. The first visual component 294c has a rose gold surface, for example. Alternatively or additionally, a visual component could have a lustrous and/or a further roughened, for example brushed, surface structure and/or a surface in silver, in dark gray silver, in copper and/or in further metallic hues. An advantageous visual impression can be made possible as a result.

The first visual component 294c comprises a plurality of partial sections with regard to a shape. The first visual component 294c comprises a first section 296c. The first section 296c has a horseshoe-shaped cross section. The first section 296c forms a part of the drive housing section 220c, in particular in the mounted state of the first visual component 294c. An end of the first visual component 294c facing away from the transition region 236c in the mounted state of the first visual component 294c has a recess 302c.

The first visual component 294c comprises a second section 298c. The second section 298c is arranged in an angled manner with respect to the first section 296c. A longitudinal extension axis of the first section 296c and a longitudinal extension axis of the second section 298c form an angle of at least 80°. The longitudinal extension axis of the first section 296c and the longitudinal extension axis of the second section 298c form an angle of at most 170°. The longitudinal extension axis of the first section 296c and the longitudinal extension axis of the second section 298c form an angle of approximately 107°. The second section 298c forms a part of the handle housing section 224c, in particular in the mounted state of the first visual component 294c.

The first visual component 294c comprises a transition section 297c between the first section 296c and the second section 298c. The transition section 297c forms a part of the transition region 236c of the housing unit 218c in the mounted state of the first visual component 294c. The transition section 297c forms a part of the outer region 238c of the transition region 236c in the mounted state of the first visual component 294c. The transition section 297c has a first opening. The transition section 297c has a second opening.

The first visual component 294c has a nose 300c. The nose 300c is adjacent to an end of the second section 298c. The nose 300c terminates the first visual component 294c.

The nose 300c is embodied in a curved fashion. A tip of the nose 300c forms the end 225c of the handle housing section 224c in the mounted state of the first visual component 294c.

The first visual component 294c is embodied as a clip component. The first visual component 294c is embodied as a terminating clip component. The first visual component 294c is provided for a clip connection to the base housing 242c. The first visual component 294c comprises a fixing unit 303c. The fixing unit 303c is provided for fixing the first visual component 294c to the base housing 242c.

The fixing unit 303c comprises a first fixing element 304c. The first fixing element 304c is embodied as a latching element, in particular latching hook. The first fixing element 304c is arranged on the first section 296c. The first fixing element 304c is provided for engaging, in particular latching, into the first cutout 288c. The fixing unit 303c comprises a second fixing element 306c. The second fixing element 306c is embodied as a latching element, in particular latching hook. The second fixing element 306c is arranged on the first section 296c. The second fixing element 306c is provided for engaging, in particular latching, into the second cutout 290c. The fixing unit 303c comprises a third fixing element 308c. The third fixing element 308c is embodied as a latching element, in particular latching hook. The third fixing element 308c is arranged on the nose 300c. The third fixing element 308c is provided for engaging, in particular latching, into the third cutout 292c.

The drive module 100c comprises two actuation units 310c, 348c. The drive module 100c comprises a first actuation unit 310c. The first actuation unit 310c is illustrated in FIGS. 5 and 17, for example. The first actuation unit 310c is embodied as a pressure actuation unit. The first actuation unit 310c is provided for manually setting at least one drive parameter of the drive unit 110c. The drive parameter is embodied at least as a rotational speed. Alternatively or additionally, a drive parameter could be embodied as a torque, as an operating function and/or as an operating mode.

The first actuation unit 310c is arranged partly in the curved transition region 236c between the handle housing section 224c and the drive housing section 220c. The first actuation unit 310c is arranged in the inner region 240c of the transition region 236c. The first actuation unit 310c is arranged partly in the drive housing section 220c. The first actuation unit 310c is arranged partly on the underside of the drive housing section 220c. The first actuation unit 310c is arranged partly in the handle housing section 224c. The first actuation unit 310c is arranged partly on the front side of the handle housing section 224c.

The first actuation unit 310c has two actuation surfaces 312c, 314c. The first actuation unit 310c has a first actuation surface 312c. The first actuation surface 312c has a concave shape as viewed in at least one direction. The first actuation surface 312c has a concave shape as viewed perpendicular to the main extension plane 102c of the drive module 100c. The first actuation surface 310c is embodied in a saddle-shaped fashion. The first actuation unit 310c has a second actuation surface 314c. The second actuation surface 314c is at least substantially parallel to a longitudinal extension axis 222c of the drive housing section 220c. The actuation surfaces 312c, 314c are provided for fundamentally different handlings.

The first actuation surface 312c is provided for the first gripping position. The first actuation surface 312c is provided for the further first gripping position. The first actuation surface 312c is arranged in the first gripping position within index finger range. The first actuation surface 312c is arranged in the further first gripping position within little finger range. The first actuation surface 312c has a longitudinal extension of at least 2 cm. The first actuation surface 312c has a transverse extension of at least 1 cm.

The second actuation surface 314c is provided for the second gripping position. The second actuation surface 314c is arranged in the second gripping position within thumb range. The second actuation surface 314c is provided for the further second gripping position. The second actuation surface 314c is arranged in the further second gripping position within index finger range. The second actuation surface 314c has a longitudinal extension of at least 2 cm. The second actuation surface 314c has a transverse extension of at least 1 cm.

Figure 22:
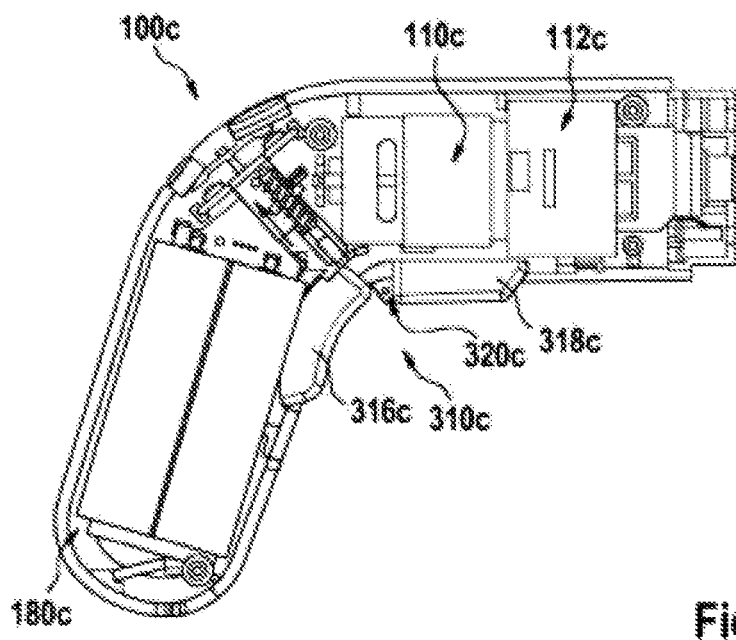
FIG. 22 shows the drive module in an opened state with a first actuation element of the first actuation unit in an actuated state as viewed perpendicular to the main extension plane of the drive module in a schematic illustration.

The first actuation unit 310c comprises a first actuation element 316c. The first actuation element 316c is arranged partly in the handle housing section 224c, in particular at one end of the handle housing section 224c. The first actuation element 316c is arranged partly in the transition region 236c. The first actuation element 316c is incorporated into the housing unit 218c. The first actuation element 316c is incorporated into the base housing 242c. The first actuation element 316c is incorporated between the first base housing component 244c and the second base housing component 246c. The first actuation element 316c is arranged in at least one gripping position within index finger range. The first actuation element 316c is arranged in the first gripping position within index finger range. FIG. 22 shows the first actuation element 316c in an actuated state.

The first actuation element 316c is embodied in the shape of a tongue. The first actuation element 316c has the first actuation surface 312c. The first actuation surface 312c rises by at least 2 mm relative to the housing unit 218c. The first actuation surface 312c rises by approximately 4 mm relative to the housing unit 218c.

The first actuation element 316c is embodied as a switch, in particular a pushbutton switch and/or an acceleration switch. An increasing actuation pressure of the first actuation element 316c brings about an increasing rotational speed of the drive unit 110c.

The first actuation unit 310c comprises a further first actuation element 318c. The further first actuation element 318c is arranged in the drive housing section 220c. The further first actuation element 318c is incorporated into the housing unit 218c. The further first actuation element 318c is incorporated into the base housing 242c. The further first actuation element 318c is incorporated between the first base housing component 244c and the second base housing component 246c. The further first actuation element 318c is arranged in at least one gripping position within index finger range. The further first actuation element 318c is arranged in the further second gripping position within index finger range. FIG. 25 shows the further first actuation element 318c in an actuated state.

The further first actuation element 318c is embodied in the shape of a tongue. The further first actuation element 318c has the second actuation surface 314c. The second actuation surface 314c rises by at least 2 mm relative to the housing unit 218c. The second actuation surface 314c rises by approximately 4 mm relative to the housing unit 218c.

A domed longitudinal end of the first actuation element 316c and a domed longitudinal end of the further first actuation element 318c are arranged in a manner facing one another. A flat longitudinal end of the first actuation element 316c and a flat longitudinal end of the further first actuation element 318c are arranged in a manner facing away from one another.

The further first actuation element 318c is embodied as a switch, in particular a pushbutton switch and/or an acceleration switch. An increasing actuation pressure on the further first actuation element 318c brings about an increasing rotational speed of the drive unit 110c. The further first actuation element 318c is redundant with respect to the first actuation element 316c. The further first actuation element 318c is functionally redundant with respect to the first actuation element 316c.

The drive module 100c comprises a separating element 320c. The curve transition region 236c has the separating element 320c. The separating element 320c is embodied as an elevation of the curved transition region 236c. The separating element 320c is embodied as a separating rib. The separating element 320c is arranged between the first actuation element 316c and the further first actuation element 318c. The separating element 320c separates the first actuation element 316c and the further first actuation element 318c from one another.

Figure 26:
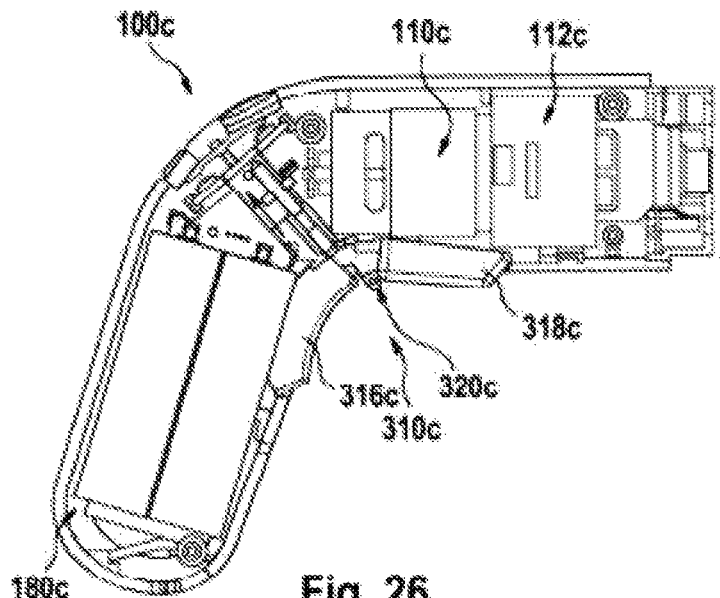
FIG. 26 shows the drive module in an opened state with the first actuation element and the second actuation element in the actuated state as viewed perpendicular to the main extension plane of the drive module in a schematic illustration.

FIG. 26 shows the first actuation element 316c and the further first actuation element 318c in an actuated state. In the actuated state of the first actuation element 316c and the further first actuation element 318c, the separating element 320c rises above the first actuation element 316c and above the further first actuation element 318c. In the actuated state of the first actuation element 316c and the further first actuation element 318c, the separating element 320c hampers an actuation of the first actuation element 316c and/or the further first actuation element 318c.

The drive module 100c comprises a switching element 326c. The switching element 326c is illustrated in FIG. 5, for example. The switching element 326c is embodied in the shape of a pin. The switching element 326c is embodied as an, in particular spring-prestressed, plunger. The switching element 326c is mounted movably along a longitudinal axis of the switching element 326c. The switching element 326c is actuatable equally via the actuation surfaces 312c, 314c of the first actuation unit 310c. The actuation surfaces 312c, 314c are functionally redundant. The switching element 326c is actuatable equally via the first actuation element 316c and via the further first actuation element 318c. The switching element 326c is coupled to the first actuation element 316c and to the further first actuation element 318c.

The drive module 100c comprises a spring element 328c. The spring element 328c is embodied as a compression spring element. The spring element 328c is embodied as a helical spring. A longitudinal extension axis of the spring element 328c corresponds to a longitudinal extension axis of the switching element 326c. The spring element 328c partly surrounds the switching element 326c.

The spring element 328c winds around the switching element 326c. The spring element 328c is provided for exerting a resetting force on the switching element 326c.

The drive module 100c comprises an electrical assembly 344c. The assembly 344c is arranged at a point of intersection of the longitudinal extension axis 222c of the drive housing section 220c and the longitudinal extension axis 226c of the handle housing section 224c as viewed perpendicular to the main extension plane 102c of the drive module 100c. The assembly 344c is embodied as a potentiometer. The assembly 344c is provided for influencing at least one electrical resistance depending on a mechanical movement of the switching element 326c. The assembly 344c is provided for converting a mechanical movement of the switching element 326c into an electrical signal, in particular control signal.

In the actuated state of the first actuation element 316c as shown in FIG. 22, the switching element 326c is displaced in the direction of the electrical assembly 344c. In the actuated state of the first actuation element 316c, the switching element 326c acts on the electrical assembly 344c. In the actuated state of the further first actuation element 318c as shown in FIG. 25, the switching element 326c is displaced in the direction of the electrical assembly 344c. In the actuated state of the further first actuation element 318c, the switching element 326c acts on the electrical assembly 344c. In the actuated state of the first actuation element 316c and of the further first actuation element 318c as shown in FIG. 26, the switching element 326c is displaced in the direction of the electrical assembly 344c. In the actuated state of the first actuation element 316c and the further first actuation element 318c, the switching element 326c acts on the electrical assembly 344c.

The drive module 100c comprises a leaf spring element 322c. The leaf spring element 322c is embodied as a spring plate. The leaf spring element 322c is provided for exerting a resetting force on the first actuation element 316c. The leaf spring element 322c is provided for pressing the first actuation element 316c out of the housing unit 218c. The leaf spring element 322c is provided for fixing the first actuation element 316c to the housing unit 218c, in particular to the handle housing section 224c.

The drive module 100c comprises a further leaf spring element 323c. The further leaf spring element 323c is embodied as a further spring plate. The further leaf spring element 323c is provided for exerting a resetting force on the further first actuation element 318c. The further leaf spring element 323c is provided for pressing the further first actuation element 318c out of the housing unit 218c. The further leaf spring element 323c is provided for fixing the further first actuation element 318c to the housing unit 218c, in particular to the handle housing section 224c.

Figure 27:
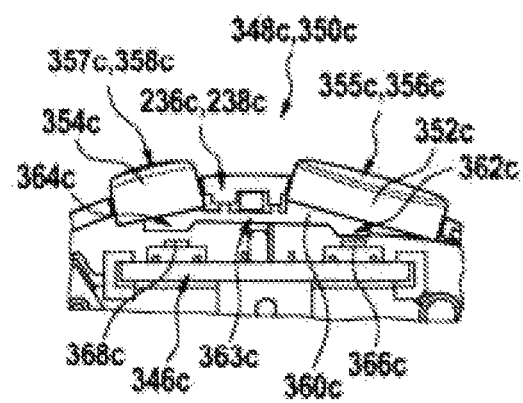
FIG. 27 shows a detail view of the second actuation unit in a mounted state in a schematic illustration.
Figure 28:
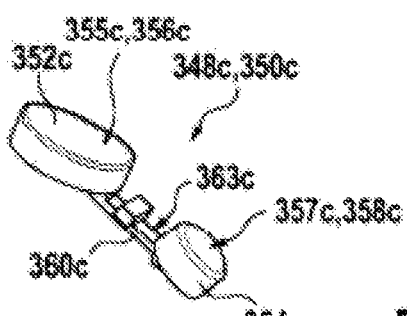
FIG. 28 shows a perspective view of the second actuation unit in a demounted state in a schematic illustration.

The drive module 100c comprises a second actuation unit 348c. The second actuation unit 348c is illustrated in FIGS. 27 and 28, for example. The second actuation unit 348c is embodied as a pressure actuation unit. The second actuation unit 348c is provided for manually actuating the drive unit 110c.

The second actuation unit 348c comprises a second actuation element 352c. The second actuation element 352c is arranged in the curved transition region 236c. The second actuation element 352c is arranged in the outer region 238c of the curved transition region 236c. The second actuation element 352c is incorporated into the housing unit 218c. The second actuation element 352c is incorporated between the first base housing component 244c and the second base housing component 246c. The second actuation element 352c is incorporated into the first opening of the transition section of the first visual component 294c.

The second actuation element 352c is arranged in the first gripping position within thumb range. The second second actuation element 352c is arranged in the further second gripping position within thumb range. The second actuation element 352c is provided for manual selection of the operating modes. The second actuation element 352c has substantially a shape of a circular cylinder. The second actuation element 352c has a convex actuation surface 356c.

The second actuation unit 348c comprises an additional second actuation element 354c. The additional second actuation element 354c is arranged in the curved transition region 236c. The additional second actuation element 354c is arranged in the outer region 238c of the transition region 236c. The additional second actuation element 354c is incorporated into the housing unit 218c. The additional second actuation element 354c is incorporated between the first base housing component 244c and the second base housing component 246c. The additional second actuation element 354c is incorporated into the second opening of the transition section of the first visual component 294c.

The additional second actuation element 354c is arranged in the first gripping position within thumb range. The additional second actuation element 354c is arranged in the further second gripping position within thumb range. The additional second actuation element 354c is provided for manually switching on the drive module 100c. The additional second actuation element 354c is provided for manually switching off the drive module 100c. The additional second actuation element 354c has substantially a shape of a circular cylinder. The additional second actuation element 354c has a convex actuation surface 358c.

The second actuation unit 348c is embodied integrally. The second actuation element 352c and the additional second actuation element 354c are connected in a non-releasable manner. The second actuation element 352c and the additional second actuation element 354c are embodied in one piece, in particular integrally.

The second actuation unit 348c comprises a connection element 360c. The connection element 360c is arranged in the transition region 236c. The connection element 360c is arranged in the outer region 238c of the transition region 236c. The connection element 360c is connected to the second actuation element 352c in a non-releasable manner. The connection element 360c and the second actuation element 352c are embodied in one piece, in particular integrally. The connection element 360c is connected to the additional second actuation element 354c in a non-releasable manner. The connection element 360c and the additional second actuation element 354c are embodied in one piece, in particular integrally. The connection element 360c has a first protuberance 362c. The first protuberance 362c is arranged at an end of the connection element 360c facing the second actuation element 352c. The connection element 360c has a second protuberance 364c. The second protuberance 364c is arranged at an end of the connection element 360c facing the additional second actuation element 354c. The connection element 360c has a central web 363c. The central web 363c connects the first protuberance 362c and the second protuberance 364c. The central web 363c is arranged in a pivotable manner.

The drive module 100c comprises a secondary circuit board 346c. The secondary circuit board 346c is arranged within the transition region 236c. A main extension plane of the secondary circuit board 346c is arranged perpendicular to the main extension plane 206c of the motherboard 204c. The secondary circuit board 346c is coupled to the central web 363c. The secondary circuit board 346c has a first switch 366c. The first switch 366c is embodied as a pushbutton switch. The first switch 366c is embodied as a microswitch. The first switch 366c is actuatable by means of the first protuberance 362c. The first switch 366c is actuatable by means of the second actuation element 352c. The secondary circuit board 346c has a second switch 368c. The second switch 368c is embodied as a pushbutton switch. The second switch 368c is embodied as a microswitch. The second switch 368c is actuatable by means of the second protuberance 364c. The second switch 368c is actuatable by means of the additional second actuation element 354c. The secondary circuit board 346c is connected to the assembly 344c. The assembly 344c is secured on the secondary circuit board 346c.

The drive module 100c comprises a second visual component 350c. The second visual component 350c comprises the additional second actuation element 354c. The second visual component 350c comprises the connection element 360c. The second visual component 350c is embodied as the second actuation element 352c, as the additional second actuation element 354c and as the connection element 360c. The first visual component 294c encloses the second visual component 350c. The second visual component 350c has two partial visual surfaces 355c, 357c separated from one another. A first partial visual surface 355c of the partial visual surfaces 355c, 357c comprises the first actuation surface 356c. A second partial visual surface 357c of the partial visual surfaces 355c, 357c comprises the second actuation surface 358c. The second visual component 350c comprises the second actuation element 352c.

The second visual component 350c is embodied as a metallic-coated visual component. The second visual component 350c is embodied as a metal-coated visual component. The second visual component 350c is embodied as an electrolytically coated visual component. The second visual component 350c comprises a main body. The main body of the second visual component 350c consists of a plastic, in particular of a thermoplastic and preferably of ABS. The second visual component 350c has at least one metallic coating, in particular metal coating. The second visual component 350c has a plurality of metal coatings, in particular electrolytic coatings. The second visual component 350c has a lustrous surface. The second visual component 350c has a rose gold surface, for example. Alternatively or additionally, a visual component could have a roughened, for example matt and/or brushed, surface structure and/or a surface in silver, in dark gray silver, in copper and/or in further metallic hues. An advantageous visual impression can be made possible as a result.

Figure 30:
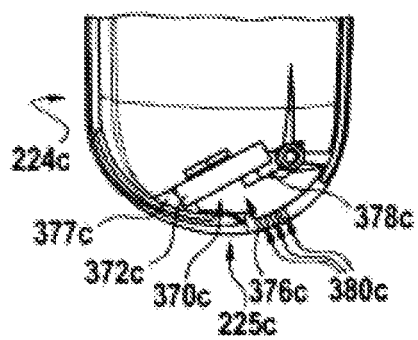
FIG. 30 shows a detail view of the information output unit in a mounted state in a schematic illustration.

The drive module 100c comprises an information output unit 370c. The information output unit 370c is illustrated in FIGS. 29 and 30. The information output unit 370c comprises a sound module 372c. The sound module 372c is arranged within the handle housing section 224c at the end 225c of the handle housing section 224c. The sound module 372c is arranged at a housing inner side. The sound module 372c is embodied as a loudspeaker. The sound module 372c has substantially a shape of a circular cylinder.

The base housing 242c has a fixing unit 376c. The fixing unit 376c is provided for fixing the sound module 372c. The fixing unit 376c has a fixing element 377c. The fixing element 377c engages around an edge of the sound module 372c. The fixing unit 376c has a further fixing element 378c. The further fixing element 378c engages around the edge of the sound module 372c. The fixing element 377c and the further fixing element 378c cooperate for fixing the sound module 372c.

The information output unit 370c comprises an amplifier, not illustrated in more specific detail. The amplifier is arranged on the motherboard 204c. The information output unit 370c comprises a sound processor, not illustrated in more specific detail. The sound processor is arranged on the motherboard 204c. The sound processor is provided for driving the amplifier and/or the loudspeaker.

Figure 31:
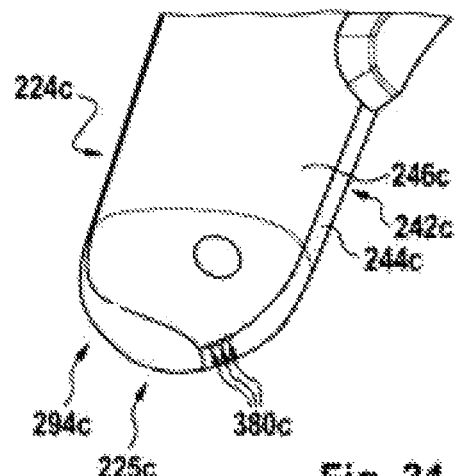
FIG. 31 shows a perspective view of an end of a handle housing section of the housing unit in a schematic illustration.

A plurality of sound openings 380c are incorporated into the housing unit 218c. The sound openings 380c are illustrated in FIGS. 29 to 31/. Three sound openings 380c are incorporated into the housing unit 218c. The main extension plane 102c of the drive module 100c intersects the sound openings 380c. The sound openings 380c are incorporated between the first base housing component 244c and the second base housing component 246c. The sound openings 380c are provided for guiding a sound emitted by the sound module 372c from a housing inner region of the housing unit 218c to a surrounding region of the drive module 100c. The sound openings 380c emit toward a side of the end 225c of the handle housing section 224c facing away from a user.

The information output unit 370c is provided for acoustically outputting information. The information output unit 370c is provided for outputting at least three, in particular at least four and advantageously at least five, mutually different items of information. The items of information are embodied as sound sequences. The information output unit 370c is provided for outputting at least one item of switch-on information. The switch-on information informs an operator about switching on of the drive module 100c and/or of the drive unit 110c. The information output unit 370c is provided for outputting at least one item of switch-off information. The switch-off information informs an operator about switching off of the drive module 100c and/or of the drive unit 110c.

The information output unit 370c is provided for outputting at least one item of charging cable connection information. The charging cable connection information informs an operator about a coupling and/or a decoupling of a charging cable, not illustrated in more specific detail, and the drive module 100c. The charging cable is provided for charging the energy storage unit 180c. The information output unit 370c is provided for outputting at least one item of charging information of the energy storage unit 180c. The charging information of the energy storage unit 180c informs an operator about a state of charge of the energy storage unit 180c. One exemplary item of charging information of the energy storage unit 180c may be a concluded charging process of the energy storage unit 180c.

The information output unit 370c is provided for outputting at least one item of mode change information. The mode change information informs an operator about a change of an operating mode of the drive unit 110c. The second actuation element 352c is provided for changing the operating mode of the drive unit 110c.

The information output unit 370c is provided for outputting at least one item of mounting information. The mounting information informs an operator about a coupling of the drive module 100c and the attachment module 400c, 480c. The mounting information is dependent on a type of the attachment module 400c, 480c. The information output unit 370c is provided for outputting at least one item of demounting information. The demounting information informs an operator about a decoupling of the drive module 100c and the attachment module 400c, 480c. The demounting information is dependent on a type of the attachment module 400c, 480c.

The information output unit 370c is provided for outputting at least one item of fault information. The fault information informs an operator about an operator control and/or operating fault. One exemplary operator control fault may be actuation of an actuation element 316c, 318c, 352c in an uncoupled state of the drive module 100c. One exemplary operating fault may be an excessively low remaining capacity of the energy storage unit 180c. The tool module system 10c comprises an attachment module 400c. The attachment module 400c is illustrated in FIG. 33. The tool module system 10c comprises a tool module. The attachment module 400c is embodied as the tool module. The attachment module 400c is embodied as a screwing module, in particular a screwdriver module. The attachment module 400c is couplable to the drive module 100c. The tool module is couplable to the drive module 100c.

Figure 32:
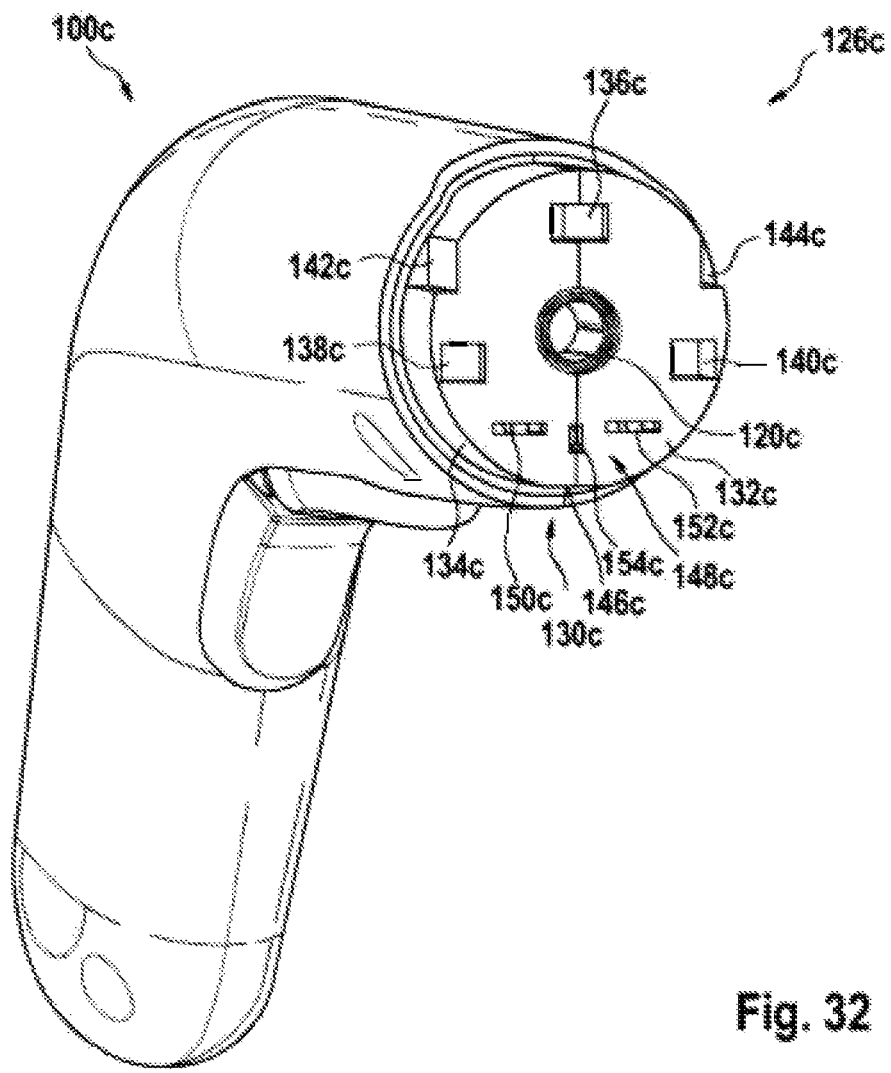
FIG. 32 shows a perspective view of the tool base module without an attachment device in a schematic illustration.

The drive module 100c comprises a mechanical drive interface 130c illustrated in FIG. 32. The attachment module 400c comprises a mechanical attachment interface 406c. The mechanical attachment interface 406c is couplable to the mechanical drive interface 130c.

The drive module 100c comprises an electrical drive interface 148c. The attachment module 400c comprises an electrical attachment interface 422c. The electrical attachment interface 422c is couplable to the electrical drive interface 148c.

In a coupled state of the drive module 100c and the attachment module 400c, the first visual component 294c is at a distance of at most 20 mm from a coupling seam between the mechanical drive interface 130c and the mechanical attachment interface 406c. In the coupled state of the drive module 100c and the attachment module 400c, the first visual component 294c directly adjoins the coupling seam between the mechanical drive interface 130c and the mechanical attachment interface 406c.

The tool module system 10c comprises a further attachment module 480c. The further attachment module 480c is illustrated in FIGS. 20, 21, 23 and 24. The further attachment module 480c is embodied as a further tool module. The further attachment module 480c is embodied as a kitchen tool module. The further attachment module 480c is embodied as a foaming module, in particular milk foaming module.

Hereinafter, the term "tool base module" should be understood synonymously with "drive base module" and "drive module". Furthermore, the term "attachment device" should be understood synonymously with "attachment module". Furthermore, the term "connection device" should be understood synonymously with "coupling device". Moreover, the term "interface", in particular of a tool base module, should be understood synonymously with "drive interface", in particular of a drive module. Furthermore, the term "interface" in particular of an attachment device, should be understood synonymously with "attachment interface", in particular of an attachment module. Furthermore, the term "open-loop and/or closed-loop control unit" should be understood synonymously with "electronic unit".

FIG. 32 shows a perspective view of the tool base module 100c without the attachment device 400c. The tool base module 100c comprises a coupling device 126c having a mechanical interface 130c for a drive-technological mechanical linking of the attachment device 400c to the main output shaft 118c. The attachment device 400c has a mechanical interface 406c corresponding to the mechanical interface 130c (cf. FIG. 33). The tool base module 100c furthermore comprises the main output shaft 118c with the shaft receptacle 120c. The shaft receptacle 120c is preferably embodied in one piece with a main output shaft 118c of the tool base module 100c. Alternatively or additionally, a coupling device could have a magnetic interface for magnetically linking an attachment device to a main output shaft.

The mechanical interface 130c is embodied such that it is at least in particular substantially cylindrical and has a plurality of positively locking elements 142c, 144c, 146c, which are arranged in particular uniformly at an outer circumference of the mechanical interface 130c and are provided for torque support of the attachment device 400c. The positively locking elements 142c, 144c, 146c of the mechanical interface 130c of the tool base module 100c are provided, in particular, to cooperate for torque support with corresponding positively locking elements 410c, 412c, 414c of the attachment device 400c. The positively locking elements 142c, 144c, 146c can be introduced in particular as material cutouts and/or recesses in a lateral surface 134c of the mechanical interface 130c, be embodied as material projections on a lateral surface 134c of the mechanical interface 130c and/or be embodied as flattened portions of a lateral surface 134c of the mechanical interface 130c. In the present exemplary embodiment, the mechanical interface 130c has three positively locking elements 142c, 144c, 146c, which are arranged in a manner offset by 120° in each case at the outer circumference of the mechanical interface 130c. In the present exemplary embodiment, the mechanical interface 130c has two positively locking elements 142c, 144c of identical type, which are embodied as material cutouts or recesses in the lateral surface 134c of the mechanical interface 130c. The two positively locking elements 142c, 144c of identical type have an at least substantially triangular cross section. The two positively locking elements 142c, 144c of identical type are provided for receiving two correspondingly embodied positively locking elements 410c, 412c of the attachment device 400c. The mechanical interface 130c furthermore has a positively locking element 146c embodied as a flattened portion of the lateral surface 134c of the mechanical interface 130c. In particular, the positively locking element 146c embodied as a flattened portion is provided for bearing against a correspondingly embodied planar positively locking element 414c of the attachment device 400c.

The mechanical interface 130c has an end face 132c which extends at least substantially perpendicular to the main output shaft 118c and in which are arranged a plurality of locking openings 136c, 138c, 140c provided for receiving locking hooks 416c, 418c, 420c of the attachment device 400c. In the present exemplary embodiment, the mechanical interface 130c has an end face 132c which extends at least substantially perpendicular to the main output shaft 118c and in which are arranged three locking openings 136c, 138c, 140c arranged around the main output shaft 118c in a manner offset by 90° in each case. All interface elements of the mechanical interface 130c and of an electrical interface 148c and the shaft receptacle 120c terminate at least substantially flush with the end face 132c. All interface elements of the mechanical interface 130c and of the electrical interface 148c are arranged at least partly in a plane which intersects the shaft receptacle 120c and which extends at least substantially perpendicular to the main output shaft 118c.

The electrical interface 148c is provided for an electrical linking of the attachment device 400c to the tool base module 100c, said electrical linking being coupled to the mechanical linking.

The electrical interface 148c has two power contact sockets 150c, 152c of identical type for transmission of a high electrical power and/or a high electric current and also a signal contact socket 154c for transmitting a low electrical power and/or a low electric current. The power contact sockets 150c, 152c are provided for transmitting an electrical power from the tool base module 100c to the attachment device 400c. The power contact sockets 150c, 152c are provided for transmitting a current of at least 20 A. The power contact sockets 150c, 152c are provided for transmitting a power of at least 100 watts. It is conceivable for the power contact sockets 150c, 152c to be provided for transmitting a higher current and/or a higher power, of 30 A and/or 500 watts, for example. In a coupled state, the power contact sockets 150c, 152c have an electrical resistance of at most 15 mΩ). In a coupled state, the power contact sockets 150c, 152c have an electrical resistance of 12 mΩ).

The signal contact socket 154c is provided for a further electrical linking of the attachment device 400c to the tool base module 100c, said further electrical linking being coupled to the mechanical linking. The signal contact socket 154c is provided for transmitting an electrical power and/or an electrical signal between the tool base module 100c and the attachment device 400c. The signal contact socket 154c is provided for transmitting a current of at most 25 mA. It is conceivable for the signal contact socket 154c to be provided for transmitting a current of up to 1 A. It is conceivable for the electrical interface 148c, in an alternative configuration, to have only the power contact sockets 150c, 152c.

The attachment device 400c is provided for a drive-technological mechanical and an electrical linking to the tool base module 100c. The attachment device 400c comprises a main input shaft 408c and a coupling device 126c having a mechanical interface 406c for a drive-technological mechanical linking of the main input shaft 408c to the main output shaft 118c of the tool base module 100c and also an electrical interface 422c for an electrical coupling to an electrical interface 148c of the tool base module 100c.

In the present exemplary embodiment, the mechanical interface 406c of the attachment device 400c has three positively locking elements 410c, 412c, 414c, which are arranged in a manner offset by 120° in each case on an inner circumference of the mechanical interface 406c of the attachment device 400c. The mechanical interface 406c of the attachment device 400c has two positively locking elements 410c, 412c of identical type, which are embodied as material projections on the inner surface of the mechanical interface 406c of the attachment device 400c. The two positively locking elements 410c, 412c of identical type are embodied as ribs. The two positively locking elements 410c, 412c of identical type are provided for being received in two correspondingly embodied positively locking elements 142c, 144c of the tool base module 100c. The mechanical interface 406c of the attachment device 400c furthermore has a positively locking element 414c embodied as a flattened portion of the inner surface of the mechanical interface 406c. The positively locking element 414c embodied as a flattened portion is provided for bearing against a correspondingly embodied planar positively locking element 146c of the tool base module 100c.

The mechanical interface 406c of the attachment device 400c has a plurality of locking hooks 416c, 418c, 420c provided for engaging in the locking openings 136c, 138c, 140c of the mechanical interface 130c of the tool base module 100c. In the present exemplary embodiment, the mechanical interface 406c of the attachment device 400c has three locking hooks 416c, 418c, 420c, which are arranged in a manner offset by 90° in each case around the main input shaft 408c.

The main input shaft 408c is provided for transmitting a torque from the main output shaft 118c of the tool base module 100c to the attachment device 400c. In the present exemplary embodiment, the main input shaft 408c of the attachment device 400c is embodied as a hexagonal shaft.

The attachment device 400c has an electrical interface 422c embodied in a manner corresponding to the electrical interface 148c of the tool base module 100c. The electrical interface 422c has two power plug contacts 424c, 426c of identical type for transmitting a high electrical power and/or a high electric current and also a signal plug contact 428c for transmitting a low electrical power and/or a low electric current. The signal plug contact 428c is arranged between the two power plug contacts 424c, 426c and oriented at least substantially perpendicular thereto. The power plug contacts 424c, 426c and the signal plug contact 428c are arranged completely within the collar formed by the mechanical interface 406c of the attachment device 400c. As a result, damage, in particular bending, of the power plug contacts 424c, 426c and of the signal plug contact 428c, for example in the event of the attachment device 400c undergoing a fall, can be at least largely prevented.

As an alternative or in addition to a mechanical interface and/or an electrical interface, a drive module and/or an attachment module could have a magnetic interface. As a result, a fast and/or guided coupling of at least two modules, in particular of the drive module and the attachment module, could advantageously be made possible.

Figure 34:
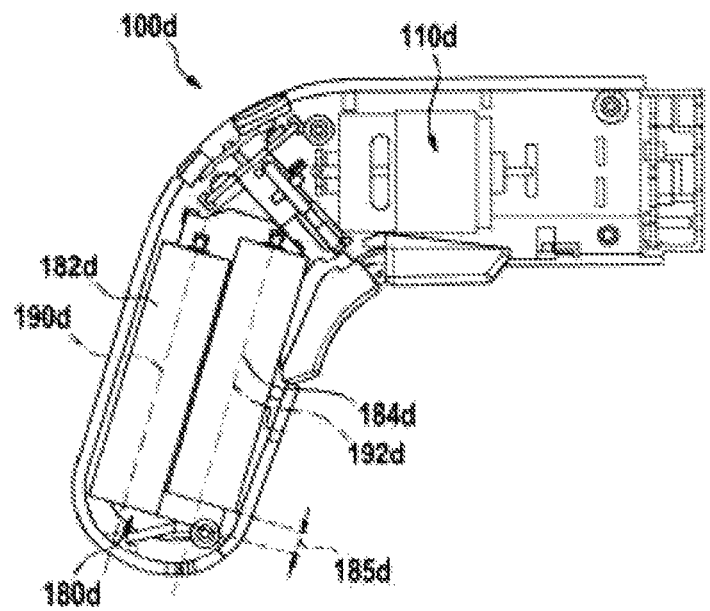
FIG. 34 shows a part of a further exemplary embodiment of a drive module in an opened state as viewed perpendicular to a main extension plane of the drive module in a schematic illustration.
Figure 35:
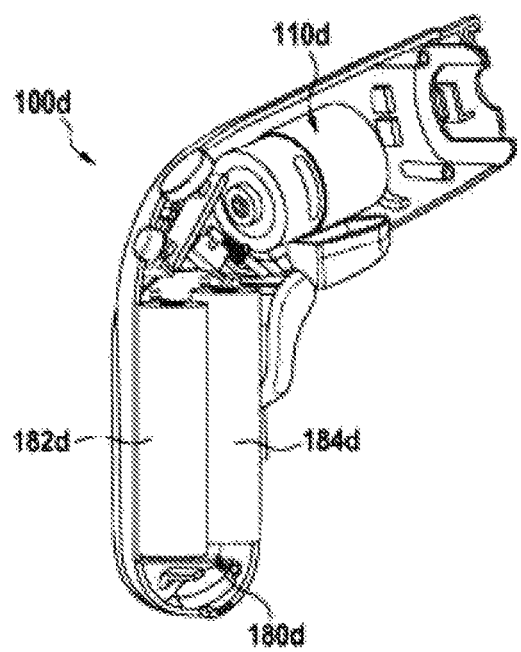
FIG. 35 shows a perspective view of the part of the drive module from FIG. 34 in a schematic illustration.

FIGS. 34 and 35 show a further exemplary embodiment. The letter d is appended to the exemplary embodiment in FIGS. 34 and 35. The further exemplary embodiment in FIGS. 34/31/34 and 35/32/35 differs from the previous exemplary embodiments at least substantially in terms of a configuration of an energy storage unit 180d.

A first energy storage cell 182d and a second energy storage cell 184d of the energy storage unit 180d have an offset 185d shown in FIG. 34/. The offset 185d is measured parallel to a longitudinal extension axis 190d of the first energy storage cell 182d. The offset 185d is measured parallel to a longitudinal extension axis 192d of the second energy storage cell 184d. The offset 185d is at least 1 mm, in particular at least 4 mm. The offset 185d is at most 12 mm, in particular at most 8 mm. The offset 185d is approximately 6 mm. FIG. 35 shows a perspective view of an arrangement of the first energy storage cell 182d and the second energy storage cell 184d.

Figure 36:
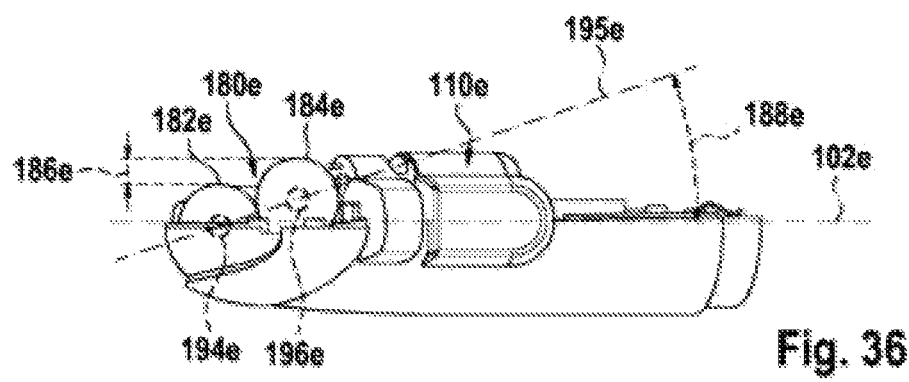
FIG. 36 shows the part of the drive module from FIG. 34 as viewed in the direction of a longitudinal extension axis of an energy storage cell of an energy storage unit of the drive module in a schematic illustration.
Figure 37:
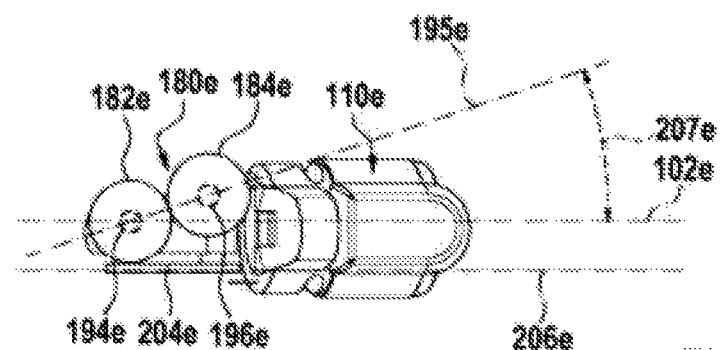
FIG. 37 shows the part of the drive module from FIG. 34 without a housing unit as viewed in the direction of the longitudinal extension axis of the energy storage cell in a schematic illustration.

FIGS. 36 and 37 show a further exemplary embodiment. The letter e is appended to the exemplary embodiment in FIGS. 36 and 37. The further exemplary embodiment in FIGS. 36 and 37 differs from the previous exemplary embodiments at least substantially in terms of a configuration of an energy storage unit 180e.

A first energy storage cell 182e and a second energy storage cell 184e of the energy storage unit 180e have a further offset 186e shown in FIG. 36. The first offset 186e is measured perpendicular to a main extension plane 102e of a drive module 100e having the energy storage unit 180e. The further offset 186e is at least 1 mm, in particular at least 3 mm. The further offset 186e is at most 10 mm, in particular at most 7 mm. The further offset 186e is approximately 5 mm. A first centroid 194e of the first energy storage cell 182e is arranged approximately in the main extension plane 102e of the drive module 100e. A second centroid 196e of the second energy storage cell 184e is arranged outside the main extension plane 102e of the drive base module 100e.

A centroid axis 195e through a first centroid 194e of the first energy storage cell 192e and through a second centroid 196e of the second energy storage cell 184e forms an angle 188e with the main extension plane 102e of the drive module 100e. The angle 188e formed by the centroid axis 195e and the main extension plane 102e of the drive module 100e is at least 5°, in particular at least 10°. The angle 188e formed by the centroid axis 195e and the main extension plane 102e of the drive module 100e is at most 45°, in particular at most 30°. The angle 188e formed by the centroid axis 195e and the main extension plane 102e of the drive module 100e is approximately 19°.

The centroid axis 195e forms an angle 207e, shown in FIG. 37, with a main extension plane 206e of a motherboard 204e of the drive module 100e. The angle 207e formed by the centroid axis 195e and the main extension plane 206e of the drive module 100e is at least 5°, in particular at least 10°. The angle 207e formed by the centroid axis 195e and the main extension plane 206e of the drive module 100e is at most 45°, in particular at most 30°. The angle 207e formed by the centroid axis 195e and the main extension plane 206e of the drive module 100e is approximately 19°.

Figure 38:
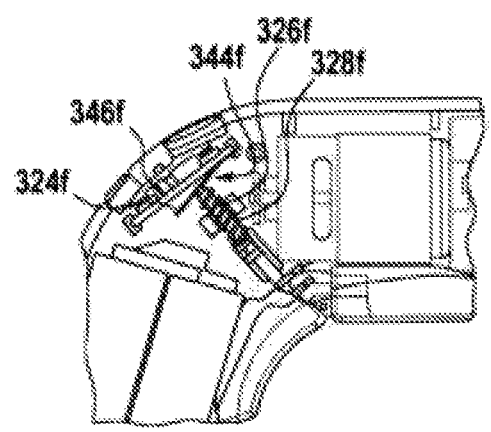
FIG. 38 shows a part of a further exemplary embodiment of a drive module in an opened state as viewed perpendicular to a main extension plane of the drive module in a schematic illustration.

FIG. 38 shows a further exemplary embodiment. The letter f is appended to the exemplary embodiment in FIG. 38. The further exemplary embodiment in FIG. 38/35/38 differs from the previous exemplary embodiments at least substantially in terms of a configuration of an electrical assembly 344f.

The electrical assembly 344f comprises a further switching element 324f. The further switching element 324f is arranged on the secondary circuit board 346f. The further switching element 324f is connected to the secondary circuit board 346f. A longitudinal end of the further switching element 324f is connected to a longitudinal end of the secondary circuit board 346f. The further switching element 324f is embodied as a switching plate. The further switching element 324f is embodied as a capacitive switching element. The further switching element 324f has a capacitance dependent on a deformation and/or a position of the further switching element 324f. A longitudinal end of the switching element 326f contacts the further switching element 324f. An actuation of the switching element 326f brings about a deformation of the further switching element 324f. An actuation of the switching element 326f brings about bending of the further switching element 324f.

Figure 39:
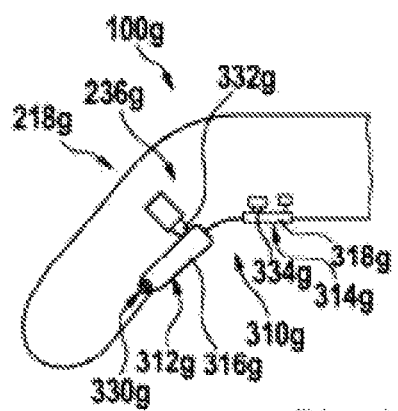
FIG. 39 shows a part of a further exemplary embodiment of a drive module with a housing unit and a first actuation unit as viewed perpendicular to a main extension plane of the drive module in a schematic illustration.
Figure 40:
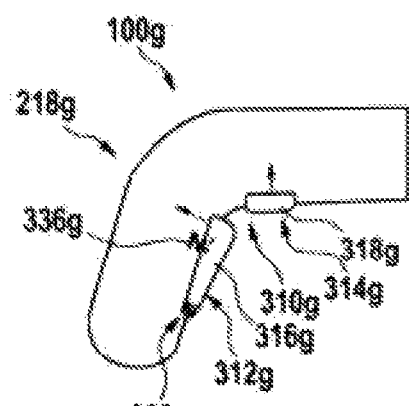
FIG. 40 shows a part of the drive module from FIG. 39 as viewed perpendicular to the main extension plane of the drive module in a schematic illustration.

FIGS. 39 and 40 show a further exemplary embodiment. The letter g is appended to the exemplary embodiment in FIGS. 39 and 40. The further exemplary embodiment in FIGS. 39 and 40 differs from the previous exemplary embodiments at least substantially in terms of a configuration of a first actuation unit 310g.

A first actuation element 316g of the first actuation unit 310g has a planar actuation surface 312g. The first actuation element 316g is mounted pivotably about a pivot axis 330g. The pivot axis 330g is arranged at a longitudinal end of the first actuation element 316g, said longitudinal end facing away from, in particular, a curved transition region 236g of a housing unit 218g.

The first actuation element 316g is provided for actuating an electrical assembly 332g, in particular a potentiometer. A further longitudinal end of the first actuation element 316g, said further longitudinal end being arranged opposite to the longitudinal end, in particular, contacts the electrical assembly 332g.

The first actuation element 316g is spring-mounted. The first actuation element 316g is mounted on the housing unit 218g by means of a spring element 336g. The first actuation element 316g is mounted on a handle housing section 224g of the housing unit 218g by means of the spring element 336g. The spring element 336g is embodied as a compression spring. The spring element 336g is embodied as a helical spring.

A further first actuation element 318g of the first actuation unit 310g has a planar second actuation surface 314g. The further first actuation element 318g is provided for actuating a second switch 334g. A longitudinal end of the further first actuation element 318g, said longitudinal end facing the transition region 236g, in particular, contacts the second switch 334g. The second switch 334g is embodied as a pushbutton switch. The second switch 334g is embodied as a microswitch.

Figure 41:
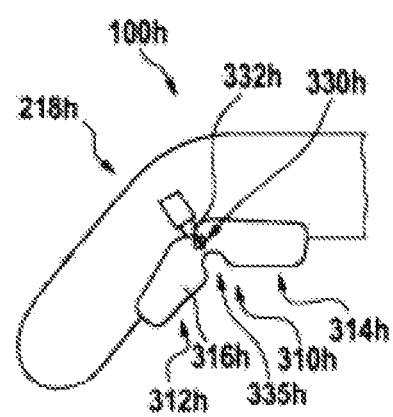
FIG. 41 shows a part of a further exemplary embodiment of a drive module with a housing unit and a first actuation unit as viewed perpendicular to a main extension plane of the drive module in a schematic illustration.
Figure 42:
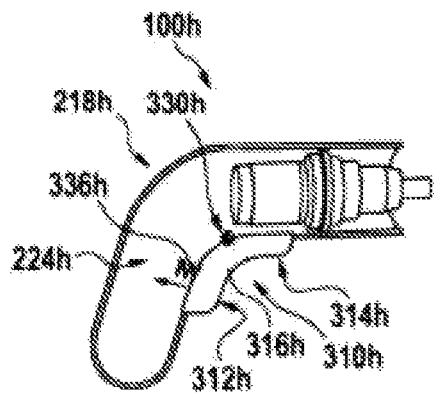
FIG. 42 shows a part of the drive module from FIG. 41 as viewed perpendicular to the main extension plane of the drive module in a schematic illustration.

FIGS. 41 and 42 show a further exemplary embodiment. The letter h is appended to the exemplary embodiment in FIGS. 41 and 42. The further exemplary embodiment in FIGS. 41 and 42 differs from the previous exemplary embodiments at least substantially in terms of a configuration of a first actuation unit 310h.

The first actuation unit 310h is embodied integrally. The first actuation unit 310h is embodied as a first actuation element 316h. The first actuation element 316h has a first actuation surface 312h and a second actuation surface 314h. The first actuation surface 312h and the second actuation surface 314h are separated from one another by a recess 335h in the first actuation element 316h. The recess 335h is embodied in a U-shaped fashion. Alternatively, a first actuation surface and a second actuation surface can merge into one another. Furthermore, the first actuation element 316h can be embodied without a recess.

The first actuation element 316h is provided for actuating an electrical assembly 332h, in particular a potentiometer. A central part of the first actuation element 316h, said central part being narrowed by the recess 335h, in particular, contacts the electrical assembly 332h. The first actuation element 316h is mounted pivotably about a pivot axis 330h. The pivot axis 330h is arranged in the central part of the first actuation element 316h. The pivot axis 330h is arranged between the recess 335h and the electrical assembly 332h.

The first actuation element 316h is spring-mounted. The first actuation element 316h is mounted on the housing unit 218h by means of a spring element 336h. The first actuation element 316h is mounted on a handle housing section 324h of the housing unit 218h by means of the spring element 336h. The spring element 336h is embodied as a compression spring. The spring element 336h is embodied as a helical spring.

Figure 43:
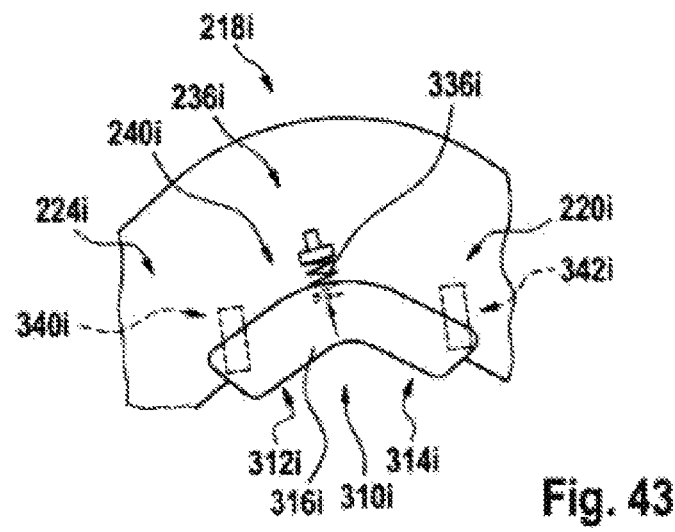
FIG. 43 shows a part of a further exemplary embodiment of a drive module with a housing unit and a first actuation unit as viewed perpendicular to a main extension plane of the drive module in a schematic illustration.

FIG. 43 shows a further exemplary embodiment. The letter i is appended to the exemplary embodiment in FIG. 43. The further exemplary embodiment in FIG. 43 differs from the previous exemplary embodiments at least substantially in terms of a configuration of a first actuation unit 310i.

The first actuation unit 310i is embodied integrally. The first actuation unit 310i is embodied as a first actuation element 316i. The first actuation element 316i has a first actuation surface 312i and a second actuation surface 314i. The first actuation surface 312i and the second actuation surface 314i merge into one another.

The first actuation element 316i is guided in a housing unit 218i. A drive housing section 220i of the housing unit 218i has a first guide element 342i. The first guide element 340i is embodied as a first guide rail. A first longitudinal end of the first actuation element 316i is guided in the first guide element 342i. A handle housing section 224i of the housing unit 218i has a second guide element 342i. The second guide element 340i is embodied as a second guide rail. A second longitudinal end of the first actuation element 316i, said second longitudinal end being arranged opposite to the first longitudinal end, in particular, is guided in the second guide element 340i.

The first actuation element 316i is mounted in a floating fashion. The first actuation element 316i is spring-mounted. The first actuation element 316i is mounted on the housing unit 218i by means of a spring element 336i. The first actuation element 316i is mounted on a curved transition region 236i, in particular an inner region 240i of a curved transition region 236i, of the housing unit 218i by means of the spring element 336i. The spring element 336i is embodied as a compression spring. The spring element 336i is embodied as a helical spring.

The first actuation element 316i is provided for actuating a switching element, not shown in more specific detail, said switching element being mechanically coupled in particular to an electrical assembly, for example a potentiometer.

Figures 44, 45:
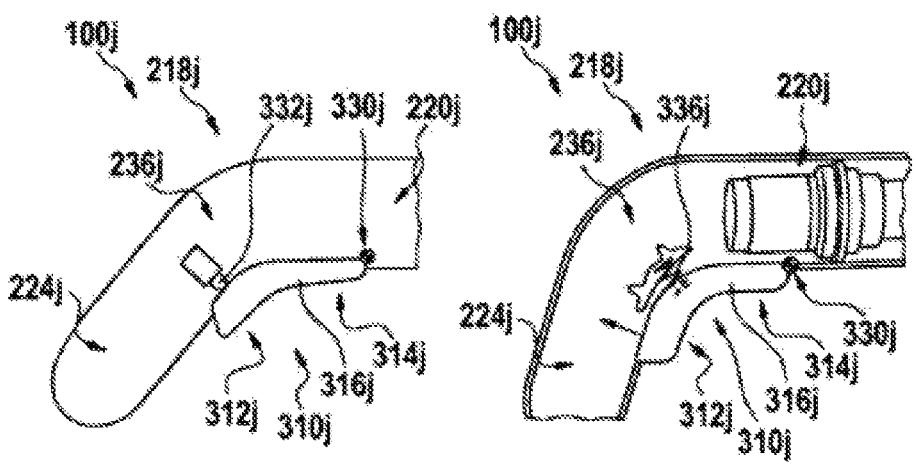
FIG. 44 shows a part of a further exemplary embodiment of a drive module with a housing unit and a first actuation unit as viewed perpendicular to a main extension plane of the drive module in a schematic illustration.
FIG. 45 shows a part of the drive module from FIG. 44 as viewed perpendicular to the main extension plane of the drive module in a schematic illustration.

FIGS. 44 and 45 show a further exemplary embodiment. The letter j is appended to the exemplary embodiment in FIGS. 44 and 45. The further exemplary embodiment in FIGS. 44 and 45 differs from the previous exemplary embodiments at least substantially in terms of a configuration of a first actuation unit 310j.

The first actuation unit 310j is embodied integrally. The first actuation unit 310j is embodied as a first actuation element 316j. The first actuation element 316j has a first actuation surface 312j and a second actuation surface 314j. The first actuation surface 312j and the second actuation surface 314j merge into one another.

The first actuation element 316j is mounted pivotably about a pivot axis 330j. The pivot axis 330j is arranged at a longitudinal end of the first actuation element 316j, said longitudinal end facing a drive housing section 220j of a housing unit 218j, in particular.

The first actuation element 316j is provided for actuating an electrical assembly 332j, in particular a potentiometer. A further longitudinal end of the first actuation element 316j, said further longitudinal end being arranged opposite to the longitudinal end, in particular, contacts the electrical assembly 332j.

The first actuation element 316j is spring-mounted. The first actuation element 316j is mounted on the housing unit 218j by means of a spring element 336j. The first actuation element 316j is mounted on a handle housing section 224j of the housing unit 218j by means of the spring element 336j. The spring element 336j is embodied as a compression spring. The spring element 336j is embodied as a helical spring.

The invention claimed is:

1. A drive base module, of a modularly constructed multifunctional handheld machine configured to connect to at least one attachment device, comprising:
   at least one connection device including at least one drive-technological interface and a data-technological interface configured to connect to the at least one attachment device;
   at least one drive unit configured to drive the at least one attachment device in a state in which the at least one attachment device is connected to the at least one connection device;
   at least one rechargeable battery unit;
   at least one information output unit configured to output information to an operator acoustically and/or haptically; and
   at least one reception and/or communication unit configured to receive a radio signal and/or to communicate with an external unit,
   wherein the at least one connection device is configured to connect the drive base module to the at least attachment device mechanically and electronically, and
   wherein the at least one information output unit is configured to output the information acoustically and/or haptically at least depending on the received radio signal and/or on received electronic data.

2. The drive base module as claimed in claim 1, further comprising:
   at least one electronic unit at least for an open-loop and/or closed-loop control of the at least one drive unit,
   wherein the at least one information output unit is configured to output the information acoustically and/or haptically at least depending on open-loop and/or closed-loop control characteristic variables of the at least one drive unit that are configured to be set by the at least one electronic unit.

3. The drive base module as claimed in claim 1, further comprising:
   at least one electronic unit having at least one sensor element configured to detect at least one connection characteristic variable of the at least one drive-technological interface and/or of the data-technological interface,
   wherein the at least one information output unit is configured to output the information acoustically and/or haptically at least depending on the detected at least one connection characteristic variable.

4. The drive base module as claimed in claim 3, wherein the at least one information output unit is configured to output the information acoustically and/or haptically at least depending on a function and/or a type of the at least one attachment device arranged at the at least one connection device.

5. The drive base module as claimed in claim 1, further comprising:
   at least one electronic unit having at least one sensor element configured to detect at least one energy supply characteristic variable,
   wherein the at least one information output unit is configured to output the information acoustically and/or haptically at least depending on the detected at least one energy supply characteristic variable.

6. The drive base module as claimed in claim 1, further comprising:
   at least one electronic unit having at least one sensor element configured to detect a processing characteristic variable,
   wherein the at least one information output unit is configured to output the information acoustically and/or haptically at least depending on the detected processing characteristic variable.

7. The drive base module as claimed in claim 1, further comprising:
   at least one electronic unit having at least one memory unit configured to store operator data,
   wherein the at least one information output unit is configured to output the information acoustically and/or haptically at least depending on the stored operator data.

8. The drive base module as claimed in claim 1, wherein the at least one information output unit is configured to output at least three mutually different items of information acoustically and/or haptically.

9. The drive base module as claimed in claim 1, further comprising:
   a housing having at least two housing sections arranged in a manner angled with respect to one another.

10. The drive base module as claimed in claim 9, further comprising:
    an energy supply unit having at least two energy storage cells,
    wherein a centroid axis through the respective centroids of the at least two energy storage cells forms an angle of at most 60° with a main extension plane of the drive base module.

11. The drive base module as claimed in claim 1, further comprising:
    an actuation unit having at least one actuation element for a manual selection of operating modes of the at least one drive unit.

12. The drive base module as claimed in claim 1, further comprising:
    a further actuation unit having at least two functionally redundant actuation surfaces for fundamentally different handlings.

13. The drive base module as claimed in claim 1, wherein the at least one information output unit is arranged in a handle region.

14. A multifunctional machine comprising:
    at least one attachment device; and
    at least one drive base module including:
       at least one connection device including at least one drive-technological interface and a data-technological interface configured to connect the at least one drive base module to the at least one attachment device mechanically and electrically;
       at least one drive unit configured to drive the at least one attachment device in a state in which the at least one attachment device is connected to the at least one connection device;
       at least one rechargeable battery unit; and
       at least one information output unit configured to output information to an operator acoustically and/or haptically; and
       a further actuation unit having at least two functionally redundant actuation surfaces for fundamentally different handlings,
    wherein the at least one information output unit is configured to output information to an operator acoustically and/or haptically at least depending on mounting and/or demounting of the at least one drive-technological interface and/or the data-technological interface and the at least one attachment device.

15. A method for acoustically and/or haptically outputting information using at least one information output unit of a drive base module of a multifunctional handheld machine, the method comprising:

connecting mechanically and electronically, using at least one connection device, at least one attachment device to the drive base module, the at least one connection device including at least one drive-technological interface and a data-technological interface;

driving, using at least one drive unit, the mechanically and electronically connected at least one attachment device;

storing operator data in at least one memory unit of at least one electronic unit; and acoustically and/or haptically outputting the information to an operator of the drive base module with the at least one information output unit at least depending on the stored operator data.

16. The method as claimed in claim 15, further comprising:

outputting the information by the at least one information output unit via excitation of the at least one drive unit.

17. The method as claimed in claim 15, further comprising:

outputting the information using the at least one information output unit at least depending on an apparatus fault and/or operator control error that have/has occurred.

18. The method as claimed in claim 15, further comprising:

outputting the information using the at least one information output unit at least depending on a change of operating mode.

19. The method as claimed in claim 15, further comprising:

outputting the information using the at least one information output unit at least depending on mounting and/or demounting of the at least one drive-technological interface and/or the data-technological interface and the at least one attachment device.

* * * * *